United States Patent
Amamiya et al.

(10) Patent No.: US 7,370,547 B2
(45) Date of Patent: May 13, 2008

(54) SHIFT CONTROL SYSTEM, SHIFT CONTROL METHOD AND SHIFT SWITCHING DEVICE

(75) Inventors: Sumiko Amamiya, Okazaki (JP); Tatsuya Ozeki, Torrance, CA (US); Shigeru Kamio, Nagoya (JP); Yasuhiro Nakai, Kariya (JP); Taku Itoh, Chita-gun (JP); Kazuo Kawaguchi, Kasugai (JP); Yasuo Shimizu, Toki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 150 days.

(21) Appl. No.: 10/552,072

(22) PCT Filed: Mar. 30, 2004

(86) PCT No.: PCT/JP2004/004571

§ 371 (c)(1),
(2), (4) Date: Oct. 4, 2005

(87) PCT Pub. No.: WO2004/090387

PCT Pub. Date: Oct. 21, 2004

(65) Prior Publication Data

US 2006/0207373 A1    Sep. 21, 2006

(30) Foreign Application Priority Data

Apr. 4, 2003  (JP) ............................. 2003-101980
Aug. 26, 2003  (JP) ............................. 2003-301547

(51) Int. Cl.
  *F16H 59/02* (2006.01)
(52) U.S. Cl. ........................................ 74/335
(58) Field of Classification Search ............. 192/219.5, 192/220.2; 74/335
See application file for complete search history.

(56) References Cited

U.S. PATENT DOCUMENTS

| | | | | |
|---|---|---|---|---|
| 4,856,360 A * | 8/1989 | Yoshimura et al. | ............ | 74/335 |
| 4,911,031 A | 3/1990 | Yoshimura et al. | | |
| 4,981,202 A | 1/1991 | Leigh-Monstevens et al. | | |
| 5,094,115 A * | 3/1992 | Michihira et al. | ............ | 74/335 |
| 6,105,448 A * | 8/2000 | Borschert et al. | ............. | 74/335 |
| 6,230,576 B1 * | 5/2001 | Yamada et al. | ................ | 74/335 |
| 6,499,371 B2 * | 12/2002 | Tsuzuki et al. | ............... | 74/335 |
| 6,564,133 B2 * | 5/2003 | Ebashi | ......................... | 701/62 |
| 6,866,611 B2 * | 3/2005 | Tsuzuki et al. | ............... | 477/97 |
| 2002/0019287 A1 | 2/2002 | Ebashi et al. | | |

FOREIGN PATENT DOCUMENTS

| | | |
|---|---|---|
| EP | 0 599 511 | 6/1994 |
| JP | 2002-310294 | 10/2002 |
| JP | 2002-323127 | 11/2002 |
| JP | 2002-349702 | 12/2002 |

\* cited by examiner

*Primary Examiner*—Ha D. Ho
(74) *Attorney, Agent, or Firm*—Oblon, Spivak, McClelland, Maier & Neustadt, P.C.

(57) ABSTRACT

A shift control system rotates an actuator to cause a wall of a detent plate to contact a roller of a detent spring, and detects the position of contact so as to detect the position of the wall of the detent plate. This wall position is set as a reference position of the actuator. Accordingly, the rotation of the actuator can appropriately be controlled even if an encoder which can only detect relative positional information is employed, and thus the shift range can appropriately be switched.

24 Claims, 14 Drawing Sheets

F I G. 5A
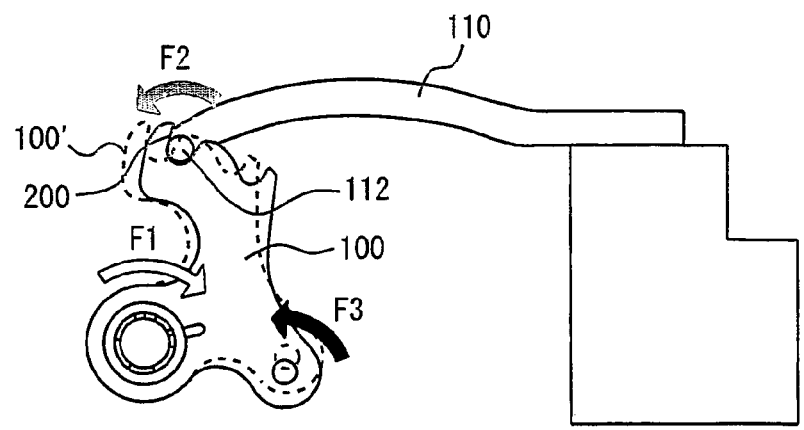
F I G. 5B
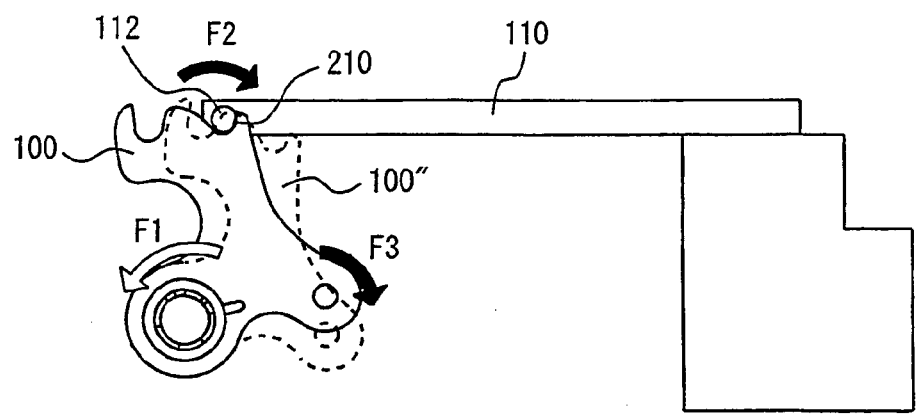

FIG. 6

| PRECEDING TRIP | | | WALL POSITION | |
|---|---|---|---|---|
| SHIFT RANGE | ACTUAL ROTATABLE AMOUNT | ECU INSTRUCTION | P WALL POSITION | NON-P WALL POSITION |
| P RANGE | DETECTED | | DETECT | NOT DETECT |
| P RANGE | UNKNOWN | | DETECT | DETECT |
| NON-P RANGE | DETECTED | | NOT DETECT | DETECT |
| NON-P RANGE | UNKNOWN | | DETECT | DETECT |
| UNKNOWN | | P RANGE | DETECT | DETECT |
| UNKNOWN | | NON-P RANGE | DETECT | DETECT |

F I G. 7

| DETECTION OF WALL POSITION | | ACTUAL ROTATABLE AMOUNT | METHOD OF CALCULATING TARGET ROTATIONAL POSITION | |
|---|---|---|---|---|
| P WALL POSITION | NON-P WALL POSITION | | P TARGET ROTATIONAL POSITION | NON-P TARGET ROTATIONAL POSITION |
| DETECTED | DETECTED | DETECTED | P WALL POSITION + MARGIN | NON-P WALL POSITION − MARGIN |
| DETECTED | UNKNOWN | DETECTED | P WALL POSITION + MARGIN | P WALL POSITION + ACTUAL ROTATABLE AMOUNT − MARGIN |
| DETECTED | UNKNOWN | UNKNOWN | P WALL POSITION + MARGIN | P WALL POSITION + DESIGNED ROTATABLE AMOUNT |
| UNKNOWN | DETECTED | DETECTED | NON-P WALL POSITION − ACTUAL ROTATABLE AMOUNT + MARGIN | NON-P WALL POSITION − MARGIN |
| UNKNOWN | DETECTED | UNKNOWN | NON-P WALL POSITION − DESIGNED ROTATABLE AMOUNT | NON-P WALL POSITION − MARGIN |

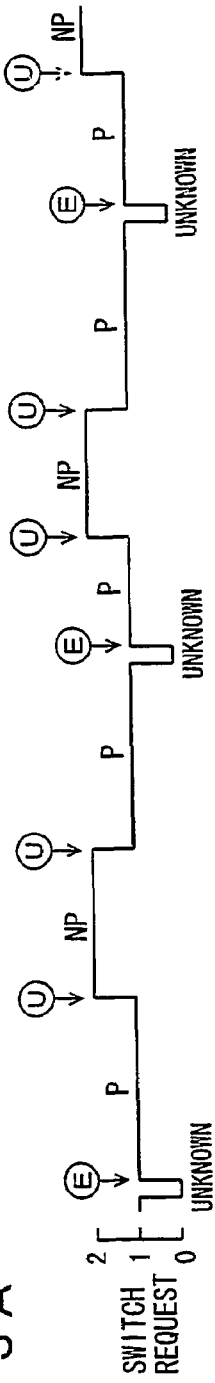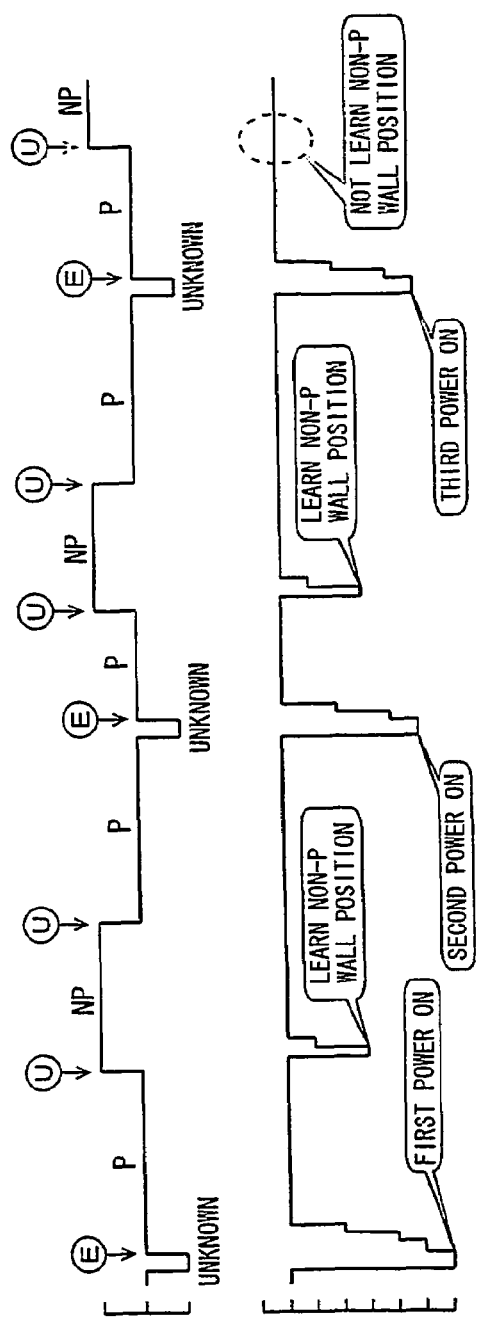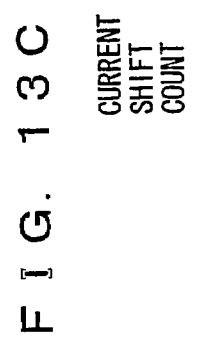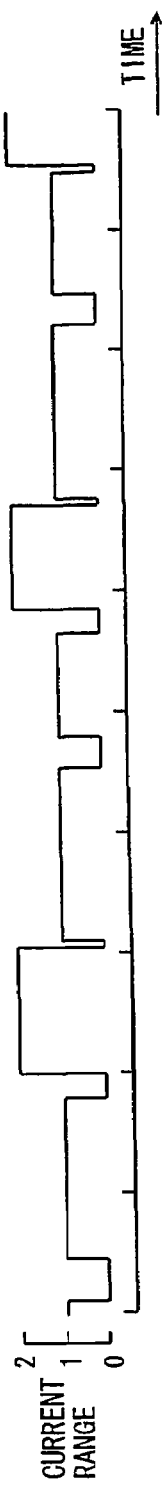

SHIFT CONTROL SYSTEM, SHIFT CONTROL METHOD AND SHIFT SWITCHING DEVICE

TECHNICAL FIELD

The present invention relates to a shift control system making a switch between shift ranges of an automatic transmission via an actuator.

BACKGROUND ART

A shift control system has been known that switches, according to operation of a shift lever by a driver, the shift range of an automatic transmission under electrical control. As such a shift control system, a system has been proposed that stores in a nonvolatile memory a rotational position of an actuator as well as a shift range of an automatic transmission prior to powering-off, in order that the absolute position of the actuator may be known when the power is turned on again after the powering-off (see Japanese Patent Laying-Open No. 2002-323127 for example). A shift-by-wire system has also been proposed that uses a value of a potentiometer that indicates a drive amount of an actuator for accurately positioning a manual valve (see Japanese Patent Laying-Open No. 2002-349702 for example).

Japanese Patent Laying-Open Nos. 2002-323127 and 2002-349702 have a precondition that the absolute position is known. Therefore, if acquired information about the position of the actuator is merely a relative amount of change in rotor position that is detected from an encoder output, the actuator cannot appropriately be controlled. Consequently, rotation of the actuator exerts some load on a shift switching mechanism, leading to deterioration in durability of the shift switching mechanism. If the shift switching mechanism is designed with the aim of improving the durability, the shift switching mechanism increases in size as well as cost.

Japanese Patent Laying-Open No. 2002-310294 discloses a shift range switching device of an automatic transmission that has an easy-to-mount actuator and accurately males a switch between shift ranges. The shift range switching device includes a shift range switching mechanism for switching a shift range of the automatic transmission to one of various drive ranges including the parking range, the actuator functioning as a power source of the shift range switching mechanism, a control circuit driving the actuator according to a switch instruction which is input through an external operation to control the shift range so that the shift range of the automatic transmission is switched to a shift range according to the switch instruction, and a detection circuit detecting the shift range position of the automatic transmission to send a detection signal to the control circuit. The control circuit sets a reference value of the shift range position of the automatic transmission from the detection signal of the detection circuit to control the actuator based on the reference value.

The shift range switching device of the automatic transmission disclosed in Japanese Patent Laying-Open No. 2002-310294 drives the actuator according to the switch instruction which is input through an external operation to control the shift range of the automatic transmission so that the shift range is switched to the one following the switch instruction. From the detection signal of the detection circuit which detects the shift range position of the automatic transmission, the reference value of the shift range position of the automatic transmission is set and, based on this reference value, the actuator is controlled. Thus, regardless of the positional precision with which the shift range switching mechanism is mounted as well as differences between individual actuators, no step of adjusting the angle at which the actuator is mounted on the automatic transmission is necessary and accordingly, mounting of the actuator on the automatic transmission is facilitated. In this way, mounting and maintenance of the actuator are facilitated and the shift range of the automatic transmission can accurately be switched by driving the shift range switching mechanism.

Although the shift range switching device of the automatic transmission disclosed in Japanese Patent Laying-Open No. 2002-310294 has the advantage of the facilitated mounting and maintenance of the actuator, the shift range switching device is required to calculate a count value which indicates the center of each range, by referring to a count value of a counter from an output signal of the detection circuit (neutral start switch) which detects the shift range position of the automatic transmission. Based on the reference value which is set according to the count value indicative of each range, the actuator is controlled. Accordingly, regardless of differences between individual actuators, the step of adjusting the angle at which the actuator is mounted on the automatic transmission is unnecessary to facilitate mounting of the actuator on the automatic transmission. Then, the neutral start switch is indispensable, resulting in problems of increases in weight and cost due to the presence of the neutral switch.

DISCLOSURE OF THE INVENTION

An object of the present invention is to provide a shift control system and a shift control method reducing a load on a shift switching mechanism that is exerted when the shift range is switched.

Another object of the present invention is to provide a shift range switching device eliminating the need for the neutral start switch and reducing a load on a shift switching mechanism that is exerted when the shift range is switched.

According to an aspect of the present invention, a shift control system is provided that switches a shift range via an actuator. The shift control system includes a shift component driven by the actuator for switching the shift range, a restriction component for restricting rotation in a predetermined direction of the actuator in a predetermined shift range, a rotation control unit for rotating the actuator, a count unit for obtaining a count value according to a rotational amount of the actuator, and a position setting unit for setting, when the actuator is rotated by the rotation control unit in the direction in which rotation of the actuator is restricted by the restriction component, a reference position of the actuator corresponding to the predetermined shift range based on a state of the count value obtained by the count unit. The shift component and the restriction component may be integrated into one structure, or the restriction component may be a part of the shift component.

With the shift control system, rotation of the actuator is restricted by the restriction component, the state of restriction is determined from the count value of the count unit so as to determine the reference position of the actuator. Accordingly, even if an encoder which can obtain only relative positional information is employed in this system, rotation of the actuator can appropriately be controlled based on the reference position. Thus, the load exerted as the actuator rotates can be reduced and the shift range can suitably be switched by the shift component. Moreover, since no potentiometer detecting an absolute position is necessary, the cost can be reduced.

The position setting unit may set the reference position of the actuator by detecting that the count value obtained by the count unit is in a state where a minimum value or a maximum value of the count value is constant for a predetermined period of time.

The position setting unit may set a reference position of the actuator corresponding to another shift range different from the predetermined shift range, based on a rotatable amount of the actuator between the predetermined shift range and that another shift range. In this way, the reference position of the actuator corresponding to another shift range can readily be set using the rotatable amount.

The position setting unit may set, when the shift component switches the predetermined shift range to another shift range, a reference position of the actuator corresponding to that another shift range. In this way, the reference position of the actuator corresponding to another shift range can efficiently be set at the timing at which the shift range is switched.

The position setting unit may set a reference position of the actuator corresponding to another shift range at a predetermined timing in order to correct a secular change of the shift component or the restriction component. The predetermined timing, for example, refers to the timing when the shift range is switched a predetermined number of times or the timing when a trip of a vehicle having this shift control system mounted thereon is done a predetermined number of times. In this way, any secular change can be corrected to accurately set two reference positions. Here, one trip may be defined as a period from turning-on of a vehicle power switch to turning-off thereof or from actual power-on of the vehicle to actual power-off thereof.

The position setting unit may detect a rotatable amount of the actuator based on the reference position corresponding to the predetermined shift range and the reference position corresponding to that another shift range. In this way, the rotatable amount is obtained and, on the subsequent trip, the reference position of the actuator for one shift range may be detected to readily detect the reference position of the actuator for the other shift range.

The rotation control unit may make smaller an output per unit time of the actuator driven for setting the reference position of the actuator than an output per unit time of the actuator driven for switching the shift range. Accordingly, any load exerted on the shift component or the restriction component can be reduced when the reference position is set.

The position setting unit may set, based on the reference position, a target rotational position, to be attained when the shift range is switched, of the actuator in the shift range with the reference position being set.

The rotation control unit may adjust, when the shift range is switched, the rotational amount of the actuator to allow the actuator to attain the target rotational position by rotating the actuator to drive the shift component.

According to another aspect of the present invention, a shift control method for switching a shift range via an actuator includes the steps of rotating, by the actuator, a shift component for switching the shift range, stopping rotation of the actuator by a restriction component for restricting rotation in a predetermined direction of the actuator in a predetermined shift range, detecting a reference position corresponding to the predetermined shift range based on a position where the stopping is effected, and determining, based on the reference position, a target rotational position when the shift range is switched by the actuator. With the above shift control method, the rotation of the actuator is stopped by the restriction component, the reference position of the actuator is detected based on the position where the stopping is effected, and the target rotational position can thus be determined based on the reference position. Accordingly, the actuator can be controlled appropriately to reach the target rotational position and the shift range can suitably be switched using the shift component.

According to still another aspect of the present invention, a shift range switching device of an automatic transmission mounted on a vehicle includes a shift component for switching a shift position to one of a plurality of shift positions by rotating an actuator, a storage unit for storing that one of shift positions resulting from switching by the shift component, a first restriction component for restricting rotation in a predetermined direction of the actuator in a first shift position among the plurality of shift positions, and a control unit for controlling rotation of the actuator. The control unit includes a first position setting unit for setting, as a first reference position of the first shift position, a position where the rotation of the actuator is stopped by the first restriction component, an electric power supply control unit for permitting start or shut-off of electric power supply to the shift range switching device for the first shift position, and a reference position re-setting unit for setting again the first reference position by the first position setting unit, when electric power supply is resumed or shut off after the shut-off of electric power supply, on the condition that the shift position stored in the storage unit is unknown.

In order to turn off an ignition switch of the vehicle that is a switch for supplying electric power to electronic equipment of the vehicle including the shift range switching device, the shift position has to be switched to a first shift position (P position for example). Then, when the ignition switch once turned off is turned on again, the shift position is inevitably the first shift position. Here, the rotational force of the actuator initially in the first shift position for detecting a first reference position (P wall position corresponding to the P position for example) is smaller than the rotational force of the actuator initially in the non-P position for detecting the first reference position. Therefore, when the initial shift position is the first shift position and the first reference position is detected, the load on the first restriction component (e.g. detent spring engaging with the detent plate) is small. In other words, by setting the first reference position when the initial shift position is the first shift position, deformation of the detent spring can be prevented or reduced. The achieved prevention or reduction of deformation of the detent spring enables the reference position of the first shift position to accurately be set and improves the durability of the shift switching mechanism. The load on the shift range switching mechanism can thus be reduced. Moreover, the rotation of the actuator is controlled by the control unit to switch the shift position. For the first shift position, the rotation of the actuator in a predetermined direction is restricted by the restriction component to set the reference position. Thus, no neutral start switch is required.

The shift range switching device of an automatic transmission may further include a second restriction component for restricting rotation of the actuator in a direction different from the predetermined direction in a second shift position among the plurality of shift positions. The control unit may further include a second position setting unit for setting, as a second reference position of the second shift position, a position where the rotation of the actuator is stopped by the second restriction component, according to re-setting of the first reference position by the reference position re-setting unit, and a movable range calculation unit for calculating a movable range of the actuator based on the first reference position re-set by the reference position re-setting unit and the second reference position set by the second position setting unit.

In this way, after the first reference position of the first shift position is set, the second reference position of the second shift position (non-P position for example) is set. Based on the set first and second reference positions, the movable range of the actuator is calculated. The first reference position is thus detected when the initial shift position is the first shift position so that the first reference position can more accurately be set. Then, the movable range can more correctly be calculated and the load on the shift component can be reduced.

The control unit may further include a setting unit for determining a first target rotational position to be attained when the shift position is switched by the actuator to the first shift position, based on the first reference position re-set by the reference position re-setting unit.

In this way, after the first reference position of the first shift position is set, the first target rotational position of the first shift position is determined based on the first reference position. The first reference position is thus detected when the initial shift position is the first shift position so that the first reference position can more accurately be set. Then, the first target rotational position can more correctly be determined and the load on the shift component can be reduced.

The shift range switching device of an automatic transmission may further include a second restriction component for restricting rotation of the actuator in a direction different from the predetermined direction in a second shift position among the plurality of shift positions. The control unit may further include a second position setting unit for setting, as a second reference position of the second shift position, a position where the rotation of the actuator is stopped by the second restriction component, according to re-setting of the first reference position by the reference position re-setting unit, and a setting unit for determining a second target rotational position to be attained when the shift position is switched by the actuator to the second shift position, based on the second reference position.

In this way, after the first reference position of the first shift position is set, the second reference position of the second shift position is set. Based on the set second reference position, the second target rotational position is determined. Accordingly, the second rotational position can more correctly be determined and the load on the shift component can be reduced.

The shift range switching device of an automatic transmission may further include a count unit for obtaining a count value according to a rotational amount of the actuator. The position setting unit may include a reference position setting unit for setting the reference position of the actuator by detecting that the count value obtained by the count unit is in a state where a minimum value or a maximum value of the count value is constant for a predetermined period of time.

The count unit (encoder for example) obtains a rotational amount of the actuator. Based on a state where the minimum value or the maximum value of the obtained count value remains constant for a predetermined period of time, the reference position corresponding to each shift position is set. Thus, even if the count unit is an encoder which can obtain relative positional information only, the rotation of the actuator can appropriately be controlled based on the reference position. Further, the load exerted when the actuator is rotated can be reduced and the shift position can suitably be switched with the shift component. Moreover, since a potentiometer for example that detects an absolute position is unnecessary, the cost can be reduced.

The first restriction component may restrict the rotation of the actuator in the predetermined direction in a manner that the rotation of the actuator is restricted in a direction of contracting a detent spring.

By providing the first restriction component (P wall of the detent plate for example) for restricting rotation in a predetermined direction of the actuator in the direction which causes the detent spring to contract, the reference position can be set for the first shift position on the basis of the P wall. In other words, it is unnecessary to set the reference position on the basis of a count value for each shift position that is referenced with such a detection circuit as a neutral switch that detects the shift position. Then, without the neutral switch, the reference position of the actuator for the first shift position can be set.

The first restriction component may restrict the rotation of the actuator in the predetermined direction in a manner that the rotation of the actuator is restricted in a direction of contracting a detent spring, and the second restriction component may restrict the rotation of the actuator in the direction different from the predetermined direction in a manner that the rotation of the actuator is restricted in a direction of pulling the detent spring.

For the first shift position, the first restriction component (P wall of the detent plate for example) is provided for restricting rotation in a predetermined direction of the actuator in a manner that causes the detent spring to contract. For the second shift position, the second restriction component (non-P wall of the detent plate for example) is provided for restricting rotation in a direction opposite to the predetermined direction of the actuator in a manner that causes the detent spring to be pulled. Then, based on the first restriction component, the reference position for the first shift position can be set and, based on the second restriction component, the reference position for the second shift position can be set. In other words, it is unnecessary to set the reference position on the basis of a count value for each shift position that is referenced with such a detection circuit as a neutral switch that detects the shift position. Then, without the neutral switch, the reference position of the actuator can be set.

The first shift position may be a P position allowing a parking mechanism to operate by driving the actuator, and the second shift position may be a non-P position inhibiting the parking mechanism from operating.

The first shift position is thus the P position. Then, power supply is shut off when the shift position is the P position. In other words, when the power supply is normally shut off, the shift position when the power supply is resumed is inevitably the P position. Therefore, when the P wall position corresponding to the P position is to be detected, the detection can always be done with the P position as the initial position.

BRIEF DESCRIPTION OF THE DRAWINGS

FIG. 5A illustrates a control method for detecting a P wall position and FIG. 5B illustrates a control method for detecting a non-P wall position.

FIG. 6 shows exemplary control of detection of the wall position.

FIG. 7 shows an exemplary method of calculating a target rotational position of the actuator.

FIGS. 13A-13D are timing charts showing an operation of a shift control system according to the second embodiment.

BEST MODES FOR CARRYING OUT THE INVENTION

Figure 1:
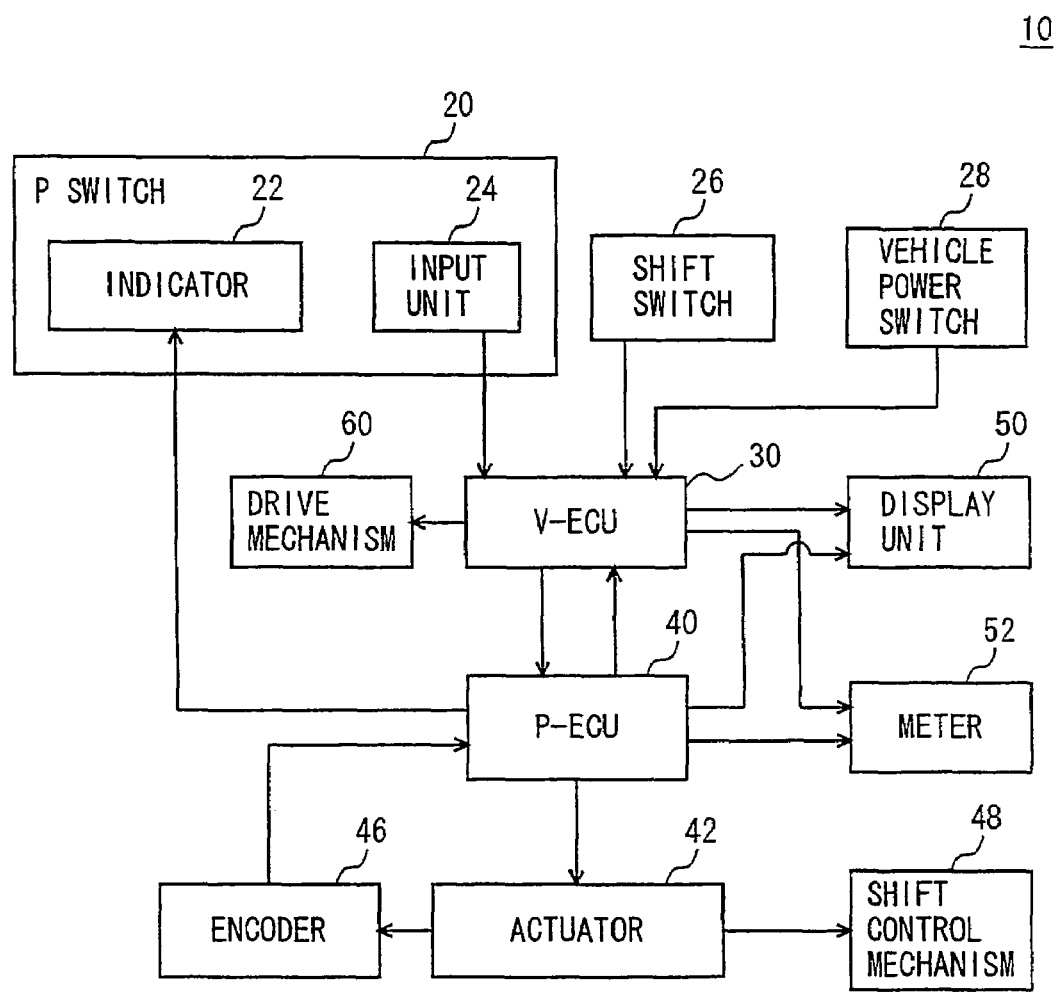
FIG. 1 shows a configuration of a shift control system according to a first embodiment.

Embodiments of the present invention are hereinafter described in connection with the drawings. In the following description, like components are denoted by like reference characters, and the like components are named identically and function identically. Thus, a detailed description thereof will not be repeated here. It is noted that the terms "shift range" and "shift position" are herein used interchangeably.

First Embodiment

FIG. 1 shows a configuration of a shift control system 10 according to a first embodiment of the present invention. Shift control system 10 of this embodiment is used for switching the shift range of a vehicle. Shift control system 10 includes a P switch 20, a shift switch 26, a vehicle power switch 28, a vehicle control unit (hereinafter referred to as "V-ECU") 30, a parking control unit (hereinafter "P-ECU") 40, an actuator 42, an encoder 46, a shift control mechanism 48, a display unit 50, a meter 52, and a drive mechanism 60. Shift control system 10 functions as a shift-by-wire system which switches the shift range under electrical control. Specifically, shift control mechanism 48 is driven by actuator 42 to switch the shift range.

Vehicle power switch 28 is a switch for turning on and turning off the electric power supply of the vehicle. Vehicle power switch 28 is not limited to a particular one, and may be an ignition switch for example. An instruction from a user, a driver for example, that is received by vehicle power switch 28 is transmitted to V-ECU 30. For example, in response to turning-on of vehicle power switch 28, electric power is supplied from an auxiliary battery (not shown) to operate shift control system 10.

P switch 20 is used to change the shift range between the parking range (hereinafter "P range") and any range except for the parking range (hereinafter "non-P range") and includes an indicator 22 for showing a state of the switch to the driver as well as an input unit 24 for receiving an instruction from the driver. The driver inputs through input unit 24 an instruction to switch the shift range to the P range. Input unit 24 may be a momentary switch. The instruction received by input unit 24 is transmitted to V-ECU 30 and to P-ECU 40 through V-ECU 30.

P-ECU 40 controls operation of actuator 42 which drives shift control mechanism 48 in order to change the shift range between the P range and the non-P range, and shows a current state of the shift range on indicator 22. If the driver presses input unit 24 when the shift range is the non-P range, P-ECU 40 switches the shift range to the P range and shows that the current shift range is the P range on indicator 22.

Actuator 42 is constructed of a switched reluctance motor (hereinafter "SR motor") and drives shift control mechanism 48 in response to an instruction from P-ECU 40. Encoder 46 rotates together with actuator 42 to detect a rotational state of the SR motor. Encoder 46 of this embodiment is a rotary encoder which outputs A-phase, B-phase and Z-phase signals. P-ECU 40 receives signals that are output from encoder 46 to know a rotational state of the SR motor and thereby control energization for driving the SR motor.

Shift switch 26 is a switch used for switching the shift range to the drive range (D), the reverse range (R), the neutral range (N) and the brake range (B) for example or canceling the P range when the P range is selected. An instruction from the driver that is received by shift switch 26 is transmitted to V-ECU 30. Based on the instruction from the driver, V-ECU 30 controls drive mechanism 60 to change the shift range and shows the current state of the shift range on meter 52. Although drive mechanism 60 here is constructed of a continuously-variable transmission mechanism, the drive mechanism may be constructed of an automatic gearbox transmission mechanism.

V-ECU 30 entirely controls operation of shift control system 10. Display unit 50 indicates instructions and warnings for example to the driver that are issued by V-ECU 30 or P-ECU 40. Meter 52 indicates a state of equipment of the vehicle and a state of the shift range.

Figure 2:
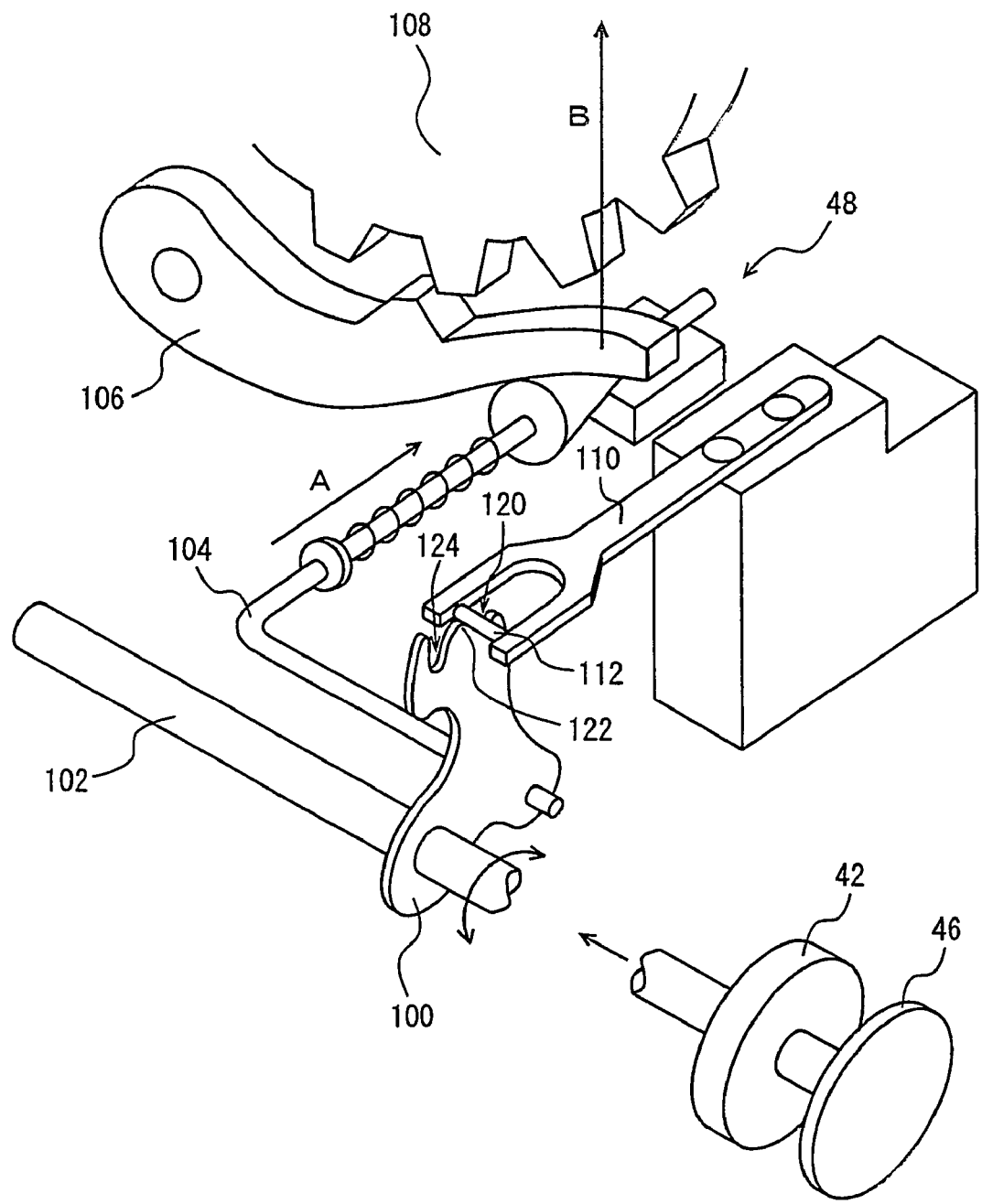
FIG. 2 shows a configuration of a shift control mechanism.

FIG. 2 shows a configuration of shift control mechanism 48. In the following description, "shift range" refers to the P range or the non-P range and does not include the R, N, D and B ranges included in the non-P range. Shift control mechanism 48 includes a shaft 102 rotated by actuator 42, a detent plate 100 rotating according to the rotation of shaft 102, a rod 104 operating according to the rotation of detent plate 100, a parking gear 108 fixed to an output shaft of a transmission (not shown), a parking lock pole 106 for locking parking gear 108, and a detent spring 110 and a roller 112 restricting the rotation of detent plate 100 to fix the shift range. Detent plate 100 functions as shift means driven by actuator 42 for switching the shift range. Shaft 102, detent plate 100, rod 104, detent spring 110 and roller 112 function as a shift switching mechanism. Further, encoder 46 functions as count means obtaining a count value according to a rotational amount of actuator 42.

FIG. 2 shows a state of the shift range which is now the non-P range. In this state, as parking lock pole 106 does not lock parking gear 108, rotations of the drive shaft of the vehicle cannot be prevented. Starting from this state, actuator 42 rotates shaft 102 in the clockwise direction so that rod 104 is pushed via detent plate 100 in the direction indicated by the arrow A in FIG. 2 and parking lock pole 106 is accordingly pushed up by a tapered portion on an end of rod 104 in the direction indicated by the arrow B in FIG. 2. As detent plate 100 rotates, roller 112 of detent spring 110 that is located in one of depressions on the top of detent plate 100, namely located at a non-P range position 120, climbs over a crest 122 and then down into the other depression, namely a P range position 124. Roller 112 is provided to detent spring 110 in such a manner that the roller is rotatable in the axial direction. When detent plate 100 rotates to such a degree that allows roller 112 to move to P range position 124, parking lock pole 106 is pushed up to a position where pole 106 engages with parking gear 108. In this way, the drive shaft of the vehicle is mechanically fixed and the shift range is switched to the P range.

Shift control system 10 of this embodiment controls, in order to reduce a load on the shift switching mechanism including detent plate 100, detent spring 110 and shaft 102 for example when the shift range is switched, the rotational amount of actuator 42 so that P-ECU 40 lessens impact which occurs when roller 112 of detent spring 110 climbs over crest 122 and then drops.

Figure 3:
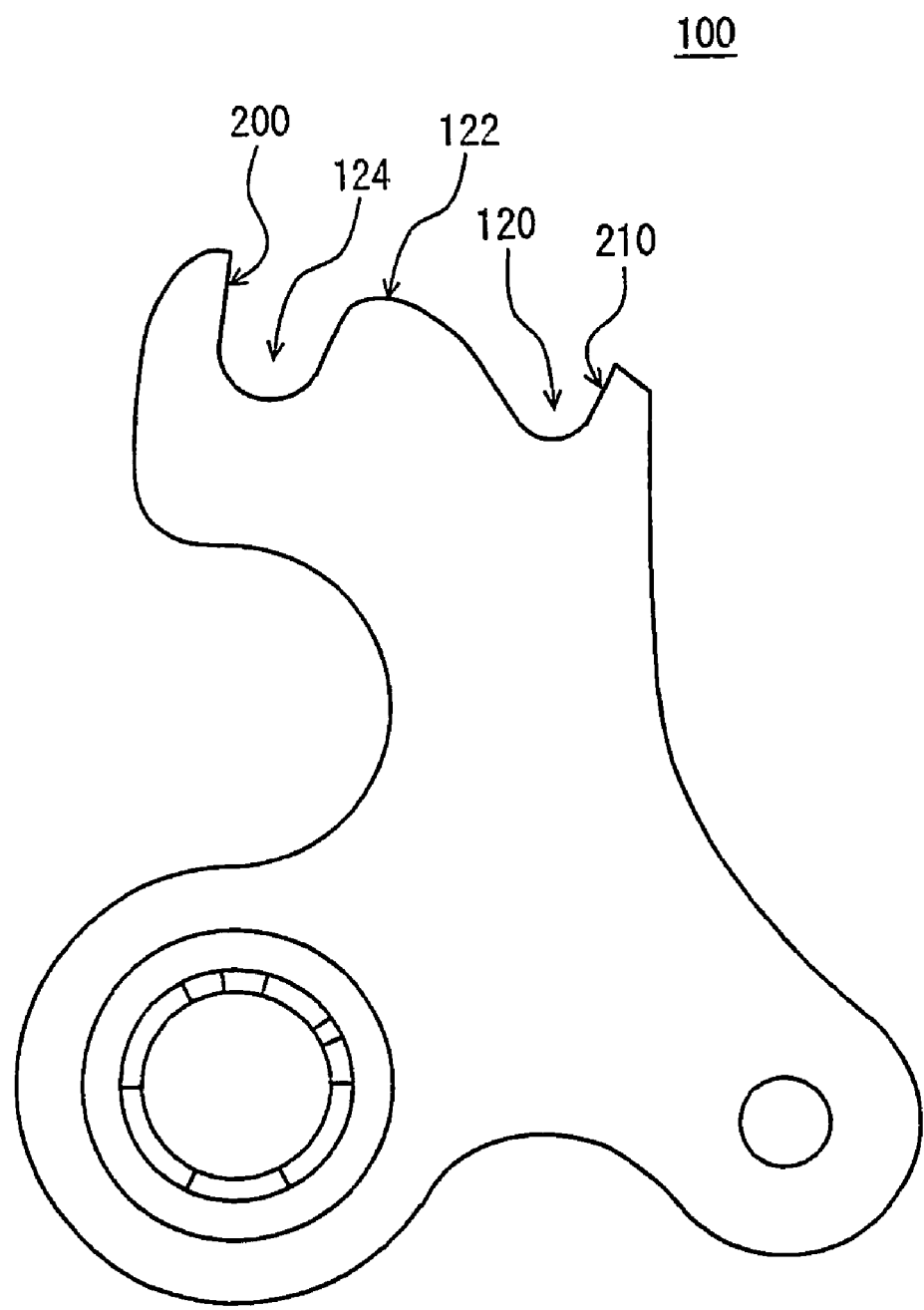
FIG. 3 shows a configuration of a detent plate.

FIG. 3 shows a configuration of detent plate 100. Of the shown two surfaces of each depression that extend from the bottom of the depression, the surface that is located away from crest 122 is called "wall". In other words, the wall is present at a position where the wall hits against roller 112 of detent spring 110 when roller 112 climbing over crest 122 drops onto the bottom of the depression without the control hereinlater described by P-ECU 40. The wall of P range position 124 is called "P wall" and the wall of non-P range position 120 is called "non-P wall". When roller 112 moves from P range position 124 to non-P range position 120, P-ECU 40 controls actuator 42 so that non-P wall 210 does not hit against roller 112. Specifically, P-ECU 40 stops the rotation of actuator 42 at a position which allows non-P wall 210 to stop immediately before hitting against roller 112. This position is called "non-P target rotational position". Moreover, P-ECU 40 controls actuator 42 so that P wall 200 does not hit against roller 112 when roller 112 moves from non-P range position 120 to P range position 124. Specifically, P-ECU 40 stops the rotation of actuator 42 at a position which allows P wall 200 to stop immediately before hitting against roller 112. This position is called "P target rotational position". Under the control of actuator 42 by P-ECU 40, the load exerted in switching the shift range on the shift switching mechanism including detent plate 100, detent spring 110 and shaft 102 for example can remarkably be reduced. By the reduction of the load, the weight and cost of the shift switching mechanism can accordingly be reduced. In this embodiment, the control hereinafter described can further reduce the weight and cost of the shift switching mechanism.

Figure 4:
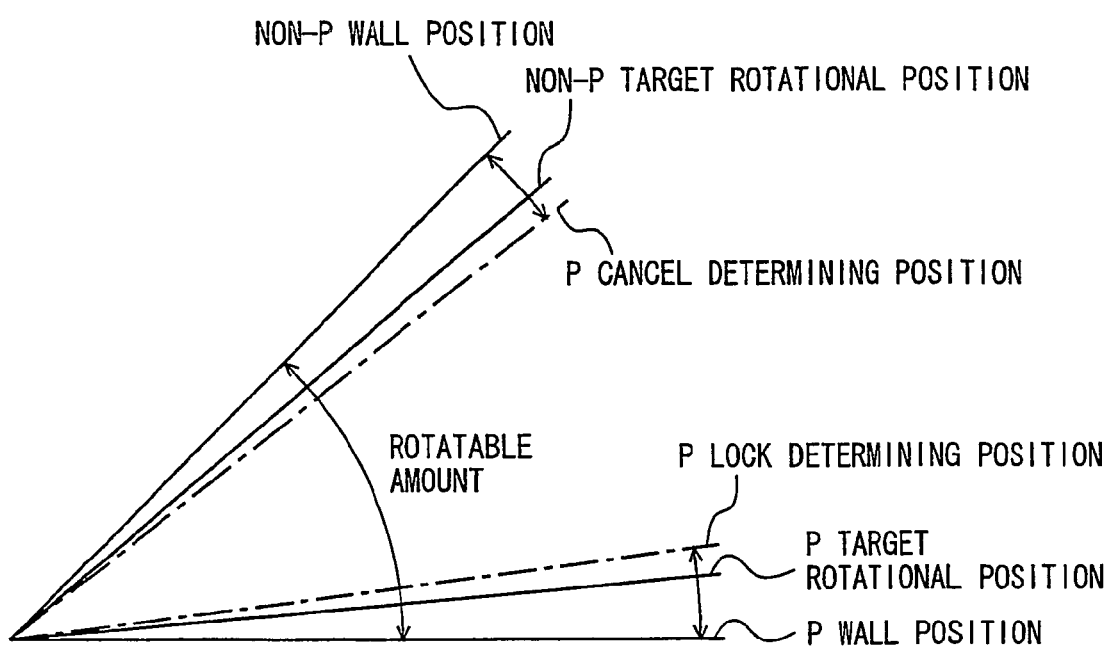
FIG. 4 illustrates a method of controlling an actuator.

FIG. 4 illustrates a method of controlling actuator 42. Actuator 42 causes detent plate 100 to rotate. The rotation of actuator 42 is restricted by P wall 200 and non-P wall 210. In FIG. 4, the position of P wall 200 and the position of non-P wall 210 in controlling the rotation of actuator 42 are conceptually shown. The region between "P wall position" and "non-P wall position" is called "rotatable amount" of actuator 42. The rotatable amount includes "actual rotatable amount" determined from a count value of encoder 46 and "designed rotatable amount" determined by design.

A current shift range is identified when the rotational amount of actuator 42 is in a region between the P wall position or the non-P wall position and a position away from the P or non-P wall position by a predetermined rotational amount. The shift range is determined on the basis of the P lock position (hereinafter P lock determining position) and on the basis of the P cancel position (hereinafter P cancel determining position). The region between the P wall position and the P lock determining position as well as the region between the non-P wall position and the P cancel determining position are defined each as a shift range determining region. Specifically, when the rotational amount of actuator 42 that is detected by encoder 46 is in the region between the P wall position and the P lock determining position, it is determined that the current shift range is the P range. On the other hand, if the rotational amount of actuator 42 is in the region between the non-P wall position and the P cancel determining position, it is determined that the current shift range is the non-P range. Further, if the rotational amount of actuator 42 is in the region between the P lock determining position and the P cancel determining position, it is determined that the shift range is uncertain or shift is now being done. The determinations above are made by P-ECU 40.

The P target rotational position is set between the P wall position and the P lock determining position. The P target rotational position corresponds to the position which allows P wall 200 not to impact against roller 112 of detent spring 110 when the non-P range is switched to the P range and is set with a predetermined margin from the P wall position. This margin is set with an allowance in consideration of backlash due to for example secular changes. Thus, the secular changes can be absorbed until the system is used a certain number of times, and the impact of P wall 200 against roller 112 when the shift range is switched can be avoided.

Similarly, the non-P target rotational position is set between the non-P wall position and the P cancel determining position. The non-P target rotational position corresponds to the position which allows non-P wall 210 not to impact against roller 112 of detent spring 110 when the P range is switched to the non-P range and is set with a predetermined margin from the non-P wall position. This margin is set with an allowance in consideration of backlash due to for example secular changes. Thus, the secular changes can be absorbed until the system is used a certain number of times, and the impact of non-P wall 210 against roller 112 can be avoided when the shift range is switched. The margin from the non-P wall position and the margin from the P wall position are not necessarily equal to each other and may be different depending on the shape for example of detent plate 100.

The method of controlling actuator 42 is heretofore described on the precondition that the P wall position and the non-P wall position have been detected. The P wall position and the non-P wall position serve as reference positions each for defining the region for determining the shift range and the target rotational position for P range position 124 or non-P range position 120. A description is now given below of a method of controlling the position of actuator 42 using encoder 46 which detects relative positional information, specifically of a method of detecting the wall position serving as the reference position.

P-ECU 40 or V-ECU 30 stores a shift range which was selected when vehicle power switch 28 was lastly turned off. When vehicle power switch 28 is thereafter turned on, P-ECU 40 sets the stored shift range as a current shift range. By wall-position detection control, a wall position for the current shift range is detected. If the last shift range is not stored, V-ECU 30 determines the current shift range based on the vehicle speed. Specifically, if the vehicle speed is a low speed of at most 3 km/h, V-ECU 30 determines that the current shift range is the P range and, if the vehicle speed is a medium-to-high speed higher than 3 km/h, V-ECU 30 determines that the current shift range is the non-P range. If the last shift range is not stored and the vehicle speed is a medium-to-high speed, this state corresponds to a state where the power was momentarily turned off when the vehicle was running and the data on the current shift range was lost. In most cases, however, it is determined that the vehicle speed is a low-speed when vehicle power switch 28 is turned on and accordingly it is determined that the current shift range is the P range.

FIG. 5A illustrates a control method for detecting the P wall position. P-ECU 40 functions as rotation control means for rotating actuator 42 as well as position setting means for setting the P wall position, namely reference position, of actuator 42. According to the control method for detecting the P wall position, detent plate 100 is rotated by actuator 42 in the clockwise direction, namely the direction in which P wall 200 moves toward roller 112 of detent spring 110 to cause P wall 200 to contact roller 112. P wall 200 in the P range position functions as restriction means for restricting the clockwise rotation of actuator 42. P wall 200 may constitute the restriction means in cooperation with detent spring 110 and roller 112. In FIG. 5A, the arrow F1 indicates a rotational force of actuator 42, the arrow F2 indicates a spring force of detent spring 110 and the arrow F3 indicates a pushing-back force of rod 104. The dotted line represents a position of detent plate 100' at which P wall 200 and roller 112 contact each other. Therefore, detection of the position of detent plate 100' corresponds to detection of the position of P wall 200.

Even after P wall 200 and roller 112 contact each other, detent plate 100 is rotated from the position indicated by the dotted line, against the spring force of detent spring 110, by the rotational force F1 of actuator 42 in the clockwise direction. Accordingly, detent spring 110 flexes to increase the spring force F2 as well as the pushing-back force F3 of rod 104. When the rotational force F1 is balanced with the spring force F2 and the pushing-back force F3, the rotation of detent plate 100 is stopped.

Whether the rotation of detent plate 100 is stopped or not is determined based on a state of a count value obtained by encoder 46. P-ECU 40 determines that the rotation of detent plate 100 and actuator 42 is stopped if a minimum value or a maximum value of the count value of encoder 46 does not change for a predetermined period of time. Which of the maximum count value and the minimum count value is to be monitored may be determined depending on encoder 46. In any case, the state where the maximum or minimum value is constant for a predetermined period of time means that detent plate 100 is stopped from rotating and thus stationary.

P-ECU 40 detects the position where detent plate 100 is stopped to use this position as "provisional P wall position" and calculates a flexure amount or flexure angle of detent spring 110. The calculation of the flexure amount or flexure angle is done using a map showing a relation of the flexure amount or flexure angle with respect to an applied voltage to actuator 42 that is held in advance in P-ECU 40. From this map, P-ECU 40 calculates the flexure amount or flexure angle corresponding to an applied voltage to actuator 42 when the provisional P wall position is detected. The map may use a battery voltage instead of the applied voltage to actuator 42. The battery voltage is monitored by P-ECU 40 and can readily be detected. In this case, the map is prepared in consideration of a voltage drop due to a wire harness from the battery to actuator 42. P-ECU 40 uses this map to make mapping correction of the provisional P wall position with the calculated flexure amount or flexure angle to finally confirm the mapping-corrected position as the P wall position. By the confirmation of the P wall position, the P lock determining position and the P target rotational position can be set. Instead of the map showing the relation of the flexure amount or flexure angle to the applied voltage, a map may be used that shows a relation of the flexure amount or flexure angle with respect to an output torque of actuator 42. Further, instead of the calculation with the map, a sensor may be used that detects the flexure amount or flexure angle for detecting the wall position.

FIG. 5B illustrates a control method for detecting the non-P wall position. P-ECU 40 functions as rotation control means for rotating actuator 42 as well as position setting means for setting the non-P wall position, namely reference position, of actuator 42. According to the control method for detecting the non-P wall position, detent plate 100 is rotated by actuator 42 in the anticlockwise direction, namely the direction in which non-P wall 210 moves toward roller 112 of detent spring 110 to cause non-P wall 210 to contact roller 112. Non-P wall 210 in the non-P range position functions as restriction means for restricting the anticlockwise rotation of actuator 42. Non-P wall 210 may constitute the restriction means in cooperation with detent spring 110 and roller 112. In FIG. 5B, the arrow F1 indicates a rotational force of actuator 42, the arrow F2 indicates a spring force of detent spring 110 and the arrow F3 indicates a pulling force of rod 104. The dotted line represents a position of detent plate 100" at which non-P wall 210 and roller 112 contact each other. Therefore, detection of the position of detent plate 100" corresponds to detection of the position of non-P wall 210.

Even after non-P wall 210 and roller 112 contact each other, detent plate 100 is rotated by the rotational force F1 of actuator 42 in the anticlockwise direction from the position indicated by the dotted line against the pulling force of detent spring 110. Accordingly, detent spring 110 extends to increase the spring force F2 as well as the pulling force F3 of rod 104. When the rotational force F1 is balanced with the spring force F2 and the pulling force F3, the rotation of detent plate 100 is stopped.

Whether the rotation of detent plate 100 is stopped or not is determined based on a count value obtained by encoder 46. Specifically, it is determined that the rotation of detent plate 100 and actuator 42 is stopped if a minimum value or a maximum value of the count value encoder 46 is constant for a predetermined period of time.

P-ECU 40 detects the position where detent plate 100 is stopped to use this position as "provisional non-P wall position" and calculates an amount of the extension of detent spring 110. The calculation of the amount of extension is done using a map showing a relation of the extension amount with respect to an applied voltage to actuator 42 that is held in advance in P-ECU 40. From this map, P-ECU 40 calculates the extension amount corresponding to an applied voltage to actuator 42 when the provisional non-P wall position is detected. P-ECU 40 uses this map to make mapping correction of the provisional non-P wall position with the calculated extension amount to finally confirm the mapping-corrected position as the non-P wall position. By the confirmation of the non-P wall position, the P cancel determining position and the non-P target rotational position can be set. Instead of the map showing the relation of the extension amount to the applied voltage, a map may be used that shows a relation of the extension amount with respect to an output torque of actuator 42. Further, instead of the calculation with the map, a sensor may be used that detects the extension amount for detecting the wall position.

In this way, under the control of detection of the wall position, the wall position for the current shift range is detected. If an actual rotatable amount between the P wall position and the non-P wall position has already been detected, the actual rotatable amount may be used to calculate a wall position for the other shift range. The actual rotatable amount may be detected, by the wall-position detection control to detect a wall position for one of the shift ranges, followed by the wall-position detection control to detect a wall position for the other shift range, and thereby measuring the region between the detected two wall positions. P-ECU 40 stores the measured actual rotatable amount. Once the actual rotatable amount is obtained, P-ECU 40 which has detected a wall position for one shift range can set a wall position for the other shift range as the position distant from the wall position for the one shift range by the actual rotational amount, and accordingly, P-ECU 40 can set the shift range determining region and the target rotational position for the two shift ranges each.

It is seen from the above that the detection of both wall positions for the P range and the non-P range respectively may be done when P-ECU 40 does not store the actual rotatable amount. For example, upon shipment of the vehicle from a factory or if data is lost in P-ECU 40, both of the wall positions are detected. Further, even if the actual rotatable amount is stored, both of the wall positions may be detected each time the shift or a trip is done a predetermined number of times. For example, if the shift range is switched a few ten thousands of times, the backlash amount due to wearing increases, resulting in an error of the actual rotatable amount. In such a case, the actual rotatable amount may newly be measured to detect the wall position and thereby address the problem of secular changes. Moreover, the detection may be done each time vehicle power switch 28 is turned on. Alternatively, in a case for example where any abnormal condition of actuator 42 occurs on a preceding trip, the wall-position detection control may be done to calculate the actual rotatable amount.

Here, one trip may be defined as the one starting when the vehicle power switch is turned on and ending when the switch is turned off, or as the one starting when the vehicle is actually powered and ending when the vehicle is actually powered off.

FIG. 6 shows exemplary control of detection of the wall position using data stored on a preceding trip. If the shift range when the preceding trip is finished is the P range, the P wall position is first detected and, if the actual rotatable amount has been detected, the non-P wall position is not detected. On the other hand, if the actual rotatable amount is unknown, the non-P wall position is detected. The non-P wall position is detected when the driver instructs to switch the shift range to the non-P range. At this time, P-ECU 40 switches the shift range to the non-P range and causes non-P wall 210 to contact roller 112 of detent spring 110 so as to detect the non-P wall position. After both of the walls are detected, P-ECU 40 measures the actual rotatable amount and stores it.

If the shift range is the non-P range when a preceding trip is completed, the non-P wall position is detected first and, if the actual rotatable amount has been detected, the P wall position is not detected. On the other hand, if the actual rotatable amount is unknown, the P wall position is detected. The P wall position is detected when the driver instructs to switch the shift range to the P range. P-ECU 40 switches the shift range to the P range and causes P wall 200 to contact roller 12 of detent spring 110 so as to detect the P wall position. After both of the wall positions are detected, P-ECU 40 measures and stores the actual rotatable amount.

If the shift range when the preceding trip is completed is unknown, V-ECU 30 determines the current shift range based on the vehicle speed to send an instruction to detect the wall position to P-ECU 40. When it is revealed from this instruction that the current shift range is set to the P range, P-ECU 40 first detects the P wall position and thereafter detects the non-P wall position in response to a shift instruction from the driver. On the other hand, if it is revealed from the instruction that the curent shift range is set to the non-P range, P-ECU 40 first detects the non-P wall position and thereafter detects the P wall position in response to a shift instruction from the driver.

FIG. 7 illustrates an exemplary method of calculating a target rotational position of actuator 42. The example in FIG. 7 supposes that the count value of encoder 46 is counted up as the actuator rotates from the P wall position toward the non-P wall position. If the P wall position, non-P wall position and actual rotatable amount have been detected, the P target rotational position is set to (P wall position+margin) and the non-P target position is set to (non-P wall position−margin).

If the P wall position has been detected, the non-P wall position is unknown and the actual rotatable amount has been detected, the P target rotational position is set to (P wall position+margin) and the non-P target rotational position is set to (P wall position+actual rotatable amount−margin). If the actual rotatable amount is unknown, the P target rotational position is set to (P wall position+margin) and the non-P target rotational position is set to (P wall position+designed rotatable amount). Here, the designed rotational amount is set to a certain value in consideration of the margin.

If the P wall position is unknown, the non-P wall position has been detected and the actual rotatable amount has been detected, the P target rotational position is set to (non-P wall position−actual rotational amount+margin) and the non-P target rotational position is set to (non-P wall position−margin). If the actual rotatable amount is unknown, the P target rotational position is set to (non-P wall position−designed rotatable amount) and the non-P target rotational position is set to (non-P wall position−margin).

According to another example, the count value of encoder 46 may be counted up as the actuator rotates from the non-P wall position toward the P wall position. In this case, if the non-P wall position, P wall position and actual rotatable amount have been detected, the non-P target rotational position is set to (non-P wall position+margin) and the P target rotational position is set to (P wall position−margin).

If the non-P wall position has been detected, the P wall position is unknown and the actual rotatable amount has been detected, the non-P target rotational position is set to (non-P wall position+margin) and the P target rotational position is set to (non-P wall position+actual rotatable amount−margin). If the actual rotatable amount is unknown, the non-P target rotational position is set to (non-P wall position+margin) and the P target rotational position is set to (non-P wall position+designed rotatable amount).

If the non-P wall position is unknown, the P wall position has been detected and the actual rotatable amount has been detected, the non-P target rotational position is set to (P wall position−actual rotatable amount+margin) and the P target rotational position is set to (P wall position−margin). If the actual rotatable amount is unknown, the non-P target rotational position is set to (P wall position−designed rotatable amount) and the P target rotational position is set to (P wall position−margin).

Figure 8:
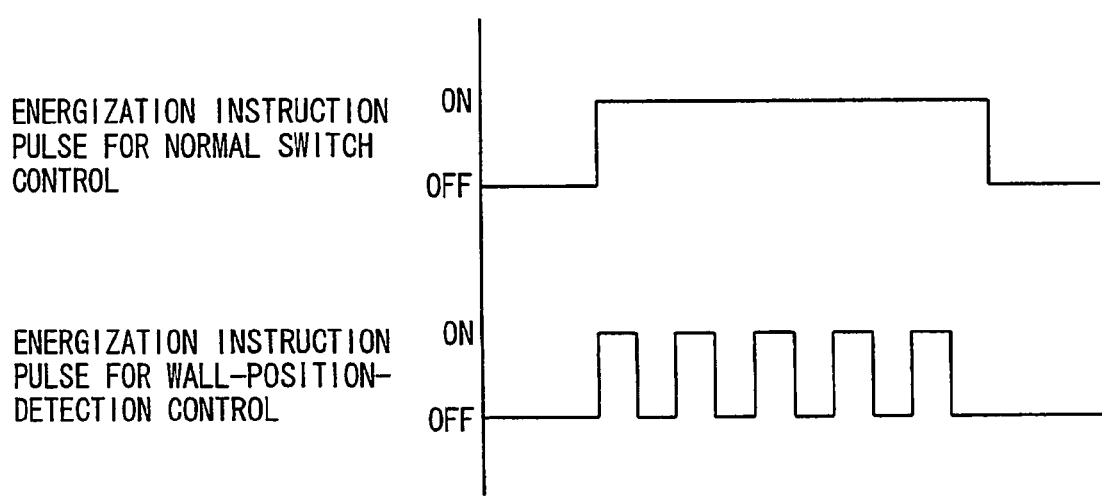
FIG. 8 shows a waveform of each energization instruction pulse applied to the actuator.

FIG. 8 shows a waveform of each energization instruction pulse applied to actuator 42. When the shift range is normally switched, a signal of an energization instruction pulse having a long high period is applied to actuator 42. When the wall-position-detection is controlled, a signal of an energization instruction pulse is applied to actuator 42 so that an output per unit time of actuator 42 when the wall position is detected is smaller than an output per unit time of actuator 42 when the shift range is normally shifted. Specifically, the on-width of the energization instruction pulse applied to actuator 42 is made small. By slowing down the rotational speed of actuator 42 when the wall-position-detection is controlled, impact between the wall and roller 112 can be reduced.

Figure 9:
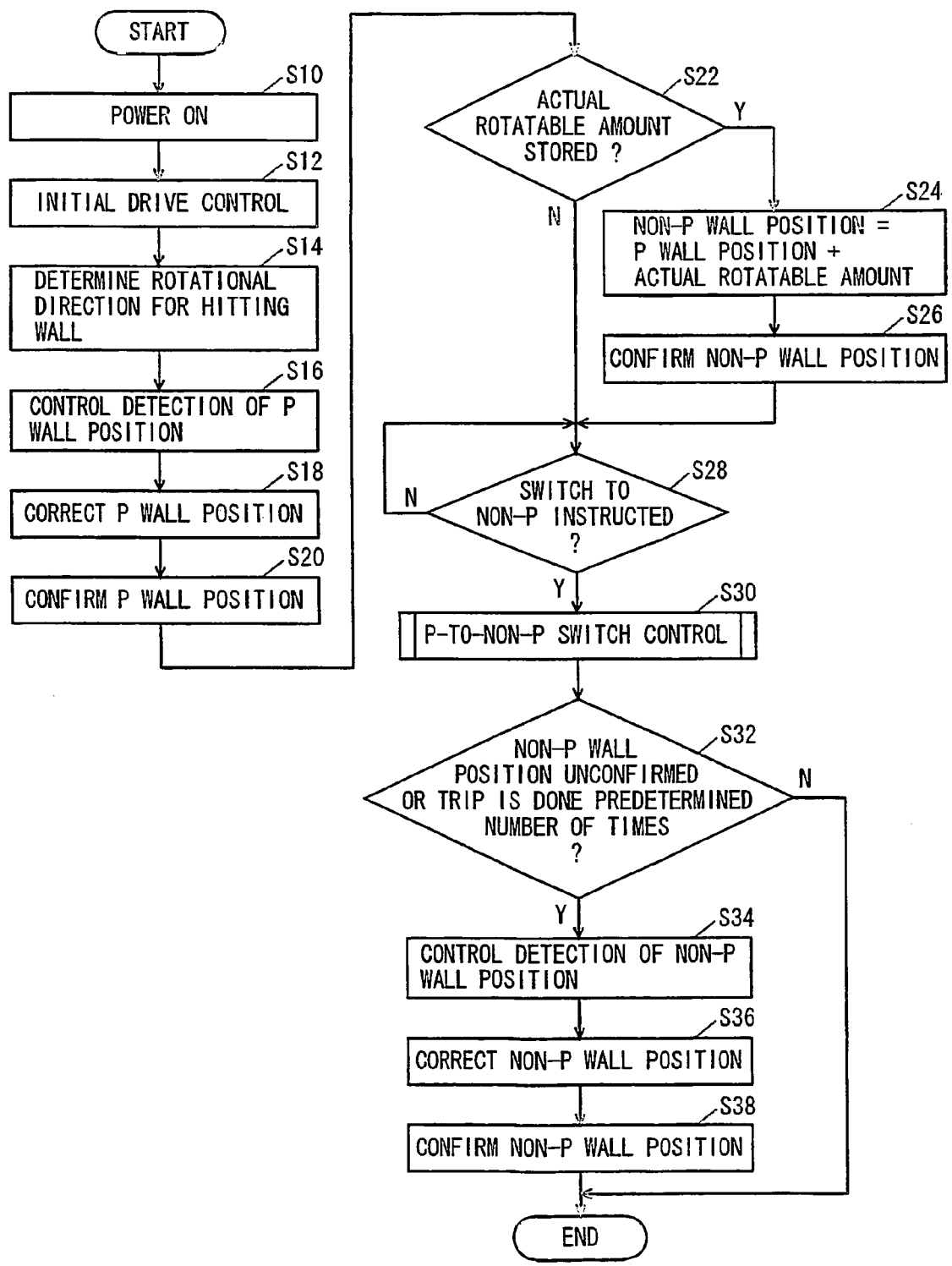
FIG. 9 is a flowchart showing a method of detecting a reference position by the shift control system according to the first embodiment.

FIG. 9 shows a flowchart of a method of detecting the reference position by shift control system 10 in the first embodiment. In this flowchart, it is supposed that the shift range upon power-on is the P range. First, a driver turns on vehicle power switch 28 to power shift control system 10 (S10). Following this, excitation-phase-matching for example of the motor, i.e., actuator 42, is done, to execute initial drive control (S12). By the execution of the initial drive control, the rotation of actuator 42 can appropriately be controlled. Under the condition that the shift range is the P range, the rotational direction of actuator 42 for hitting the wall against the roller is determined (S14). Specifically, the determined rotational direction of actuator 42 is the direction which allows P wall 200 to hit against roller 112 of detent spring 110.

Based on a state of a count value of encoder 46, control of detection of the P wall position is done to detect the provisional P wall position (S16). The provisional P wall position is corrected with the map (S18), and the corrected position is confirmed as the P wall position (S20). If the actual rotatable amount is stored (Y in S22), the non-P wall position is calculated to be a position of (P wall position+ actual rotatable amount) (S24) to confirm the non-P wall position (S26). In S24, although the non-P wall position is calculated on the precondition that the count value of encoder 46 is counted up as the actuator rotates from the P wall position toward the non-P wall position, the count value may be counted up as the actuator rotates from the non-P wall position toward the P wall position. In the latter case, the non-P wall position is calculated to be a position of (P wall position−actual rotatable amount).

If the actual rotatable amount is not stored (N in S22), it is determined whether or not the driver gives an instruction to switch the shift range to the non-P range (S28). If there is no switch instruction (N in S28), monitoring of the switch instruction is continued. If the switch instruction is given (Y in S28), the P range is accordingly switched to the non-P range (S30).

Figure 10:
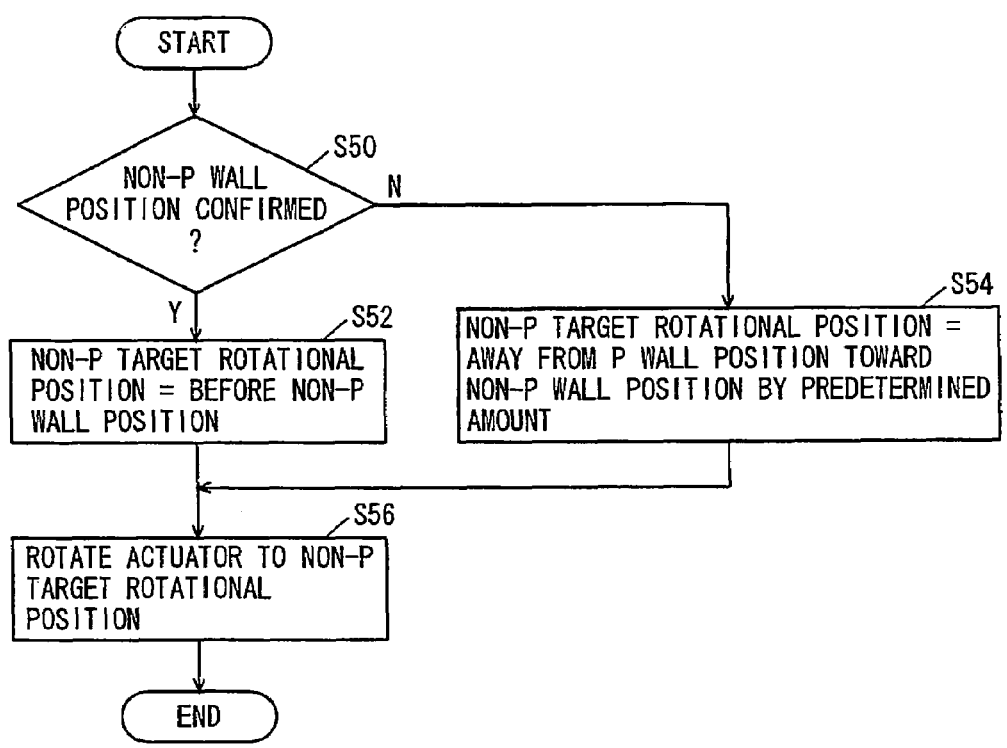
FIG. 10 is a flowchart showing control of switching to the non-P range in step S30 of FIG. 9.

FIG. 10 shows a flowchart of the control of the switch to the non-P range in S30 of FIG. 9. It is first determined whether or not the non-P wall position has been confirmed (S50). If confirmed (Y in S50), the non-P target rotational position is set to a position before the non-P wall position (S52) and actuator 42 is rotated to the non-P target rotational position. In this way, the shift range can be switched to the non-P range without causing non-P wall 210 to contact roller 112 of detent spring 10.

If the non-P wall position has not been confirmed (N in S50), the non-P target rotational position is set to a position away from the P wall position toward the non-P wall position by a predetermined rotational amount (S54). The designed rotatable amount may be used to set the non-P target rotational position. Then, actuator 42 is rotated to the non-P target rotational position (S56).

Referring back to FIG. 9, after the switch control in S30 is completed, it is determined whether the non-P wall position has been unconfirmed, or whether a trip is done a predetermined number of times (S32). If the non-P wall position has been confirmed and the trip is not done the predetermined number of times (N in S32), this flow is ended. If the non-P wall position has been unconfirmed or the trip is done the predetermined number of times (Y in S32), the non-P wall position is detected based on the state of the count value of encoder 46 so as to detect the provisional non-P wall position (S34). The provisional non-P wall position is corrected with the map (S36), and the corrected position is confirmed as the non-P wall position (S38). At this time, from the P wall position and the non-P wall position, the actual rotatable amount is measured. The actual rotatable amount is stored in P-ECU 40 for use in setting the wall position on the next and subsequent trips.

The present invention is heretofore described in connection with the first embodiment. The present invention, however, is not limited to this embodiment and various modifications thereof are effective each as an embodiment of the present invention. For example, although detent plate 100 herein described has two shift ranges, i.e., P range and non-P range, the detent plate may have a plurality of shift ranges like D range and R range for example. If the detent plate has three or more shift ranges, respective wall positions corresponding to the outermost shift range positions may be set to the reference positions respectively so that switching of the shift range can suitably be controlled.

The present invention can thus provide the shift control system and the shift control method reducing the load on the shift switching mechanism that is exerted when the shift range is switched.

Second Embodiment

According to the first embodiment as discussed above, shift control system 10 rotates actuator 42 to cause a wall of detent plate 100 and roller 112 of detent spring 110 to contact each other. The position of contact is then detected so as to detect the position of the wall of detent plate 100 corresponding to a reference position of the shift range. The wall position can thus be set as a reference position of actuator 42 to appropriately control the rotation of actuator 42 even when encoder 46 which can detect relative positional information only is used. In other words, without a neutral start switch or the like, the shift range can appropriately be switched. Here, in switching the shift range by the above-described method, (1) the rotation of actuator 42 is controlled until the actuator reaches a position which causes the shift range to switch and (2) for the purpose of improving the durability, the rotation of actuator 42 is stopped before the wall of detent plate 100 hits against the roller when the shift range is being switched. In order to satisfy the conditions (1) and (2), the actual rotatable amount of actuator 42 in switching the shift range has to be learned.

When the P wall position is detected, detent spring 110 is contracted. In contrast, detent spring 110 is pulled when the non-P wall position is detected. Then, when the wall position is detected, there arises a difference in deformation of the spring between a case where a wall position is detected for an initial shift range which is set at the start of the detection and a case where a wall position is detected for a shift range which is different from the initial shift range. Therefore, it could be possible that the actual rotatable amount varies depending on the shift range which is set at the start of the detection. A second embodiment solves this problem. It is noted that description of FIGS. 1-10 for the second embodiment is the same as that for the first embodiment and thus the description will not be repeated here.

Figure 11:
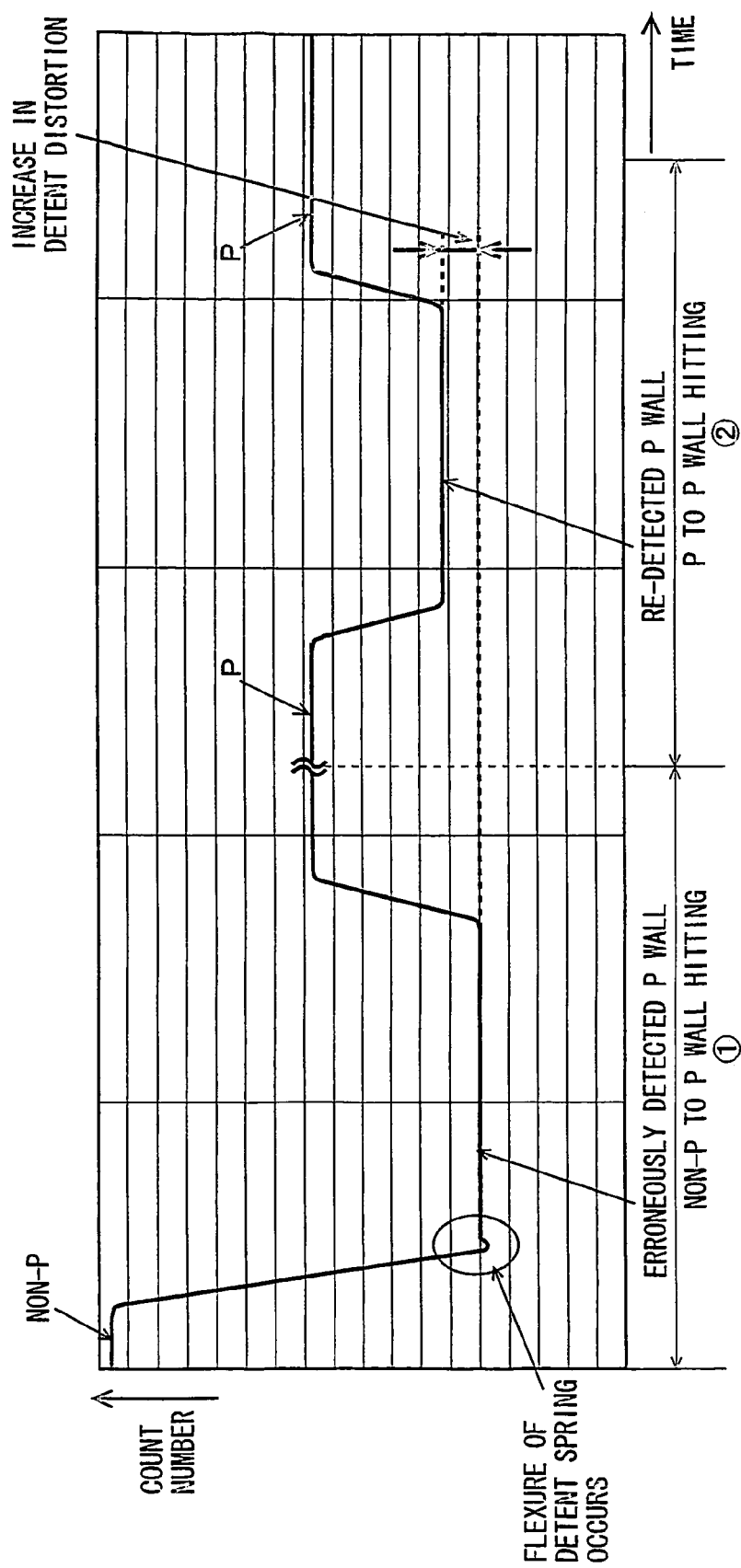
FIG. 11 is a timing chart according to a second embodiment showing a change in count number of an encoder when the wall position is detected by causing a roller initially in the non-P range position to hit against the P wall.

FIG. 11 shows an example of a timing chart showing a change in count number of encoder 46 when the wall position is detected by causing the roller initially in the non-P range position to hit against the P wall. In the timing chart of FIG. 11, the horizontal axis indicates time and the vertical axis indicates count number of encoder 46. In this case, the maximum value of the count number of encoder 46 corresponds to the non-P wall position where roller 112 contacts non-P wall 210 of detent plate 100. On the other hand, the minimum value of the count number of encoder 46 corresponds to the P wall position where roller 112 contacts P wall 200 of detent plate 100. With reference to FIG. 11, when the roller initially in the non-P range position is caused to hit against the P wall, the contact of roller 112 with P wall 200 of detent plate 100 leads to flexure of detent spring 110, resulting in contraction of detent spring 110. This is due to a large rotational force when the roller initially in the non-P range position is caused to hit against the P wall. Specifically, it is considered that the rotational force applied for allowing the roller initially in the non-P range position to contact and hit against the P wall includes, in addition to an output torque of actuator 42, the impact force occurring when the roller climbs over crest 122 of detent plate 100 and then drops into the depression. As a result, the P wall position could erroneously be learned. The erroneous learning of the P wall position causes errors of the target rotational position and the actual rotatable amount, so that the roller could impact against the wall of detent plate 100 when the shift is normally switched. In other words, the load on detent spring 110 increases. Therefore, it is desirable to detect the P wall position by hitting the roller initially in the P range position, rather than the non-P range position, against the P wall.

For example, if the current shift range is unknown and the P wall position is to be detected through the wall-hit learning by hitting the roller originally in the non-P range position against the P wall, the erroneous learning of the P wall position could occur as described above. Consequently, the actual rotatable amount could erroneously be learned. Therefore, in this embodiment, when the current shift range is unknown, the actual rotatable amount is detected again on the second trip, as specifically described below.

It is supposed that the electric power supply of P-ECU 40 or the vehicle cannot be shut off unless the shift range is switched to the P range. It is further supposed that, when vehicle power switch 2S is turned on to start powering shift control system 10, namely when the power is turned on for a first trip, the current shift range stored in an internal memory (not shown) of P-ECU 40 is unknown. In this case, when a user who switched the shift range to the P range for turning off the power thereafter turns on the power (second trip), the shift range has inevitably been switched to the P range. Accordingly, the P wall position can be detected again through the wall-hit learning which is done by allowing the roller initially in the P range position to hit against the P wall.

The state where "the current shift range is unknown" includes a state where the shift range stored in the internal memory of P-ECU 40 is erased due to initialization of the battery for example.

Figure 12A:
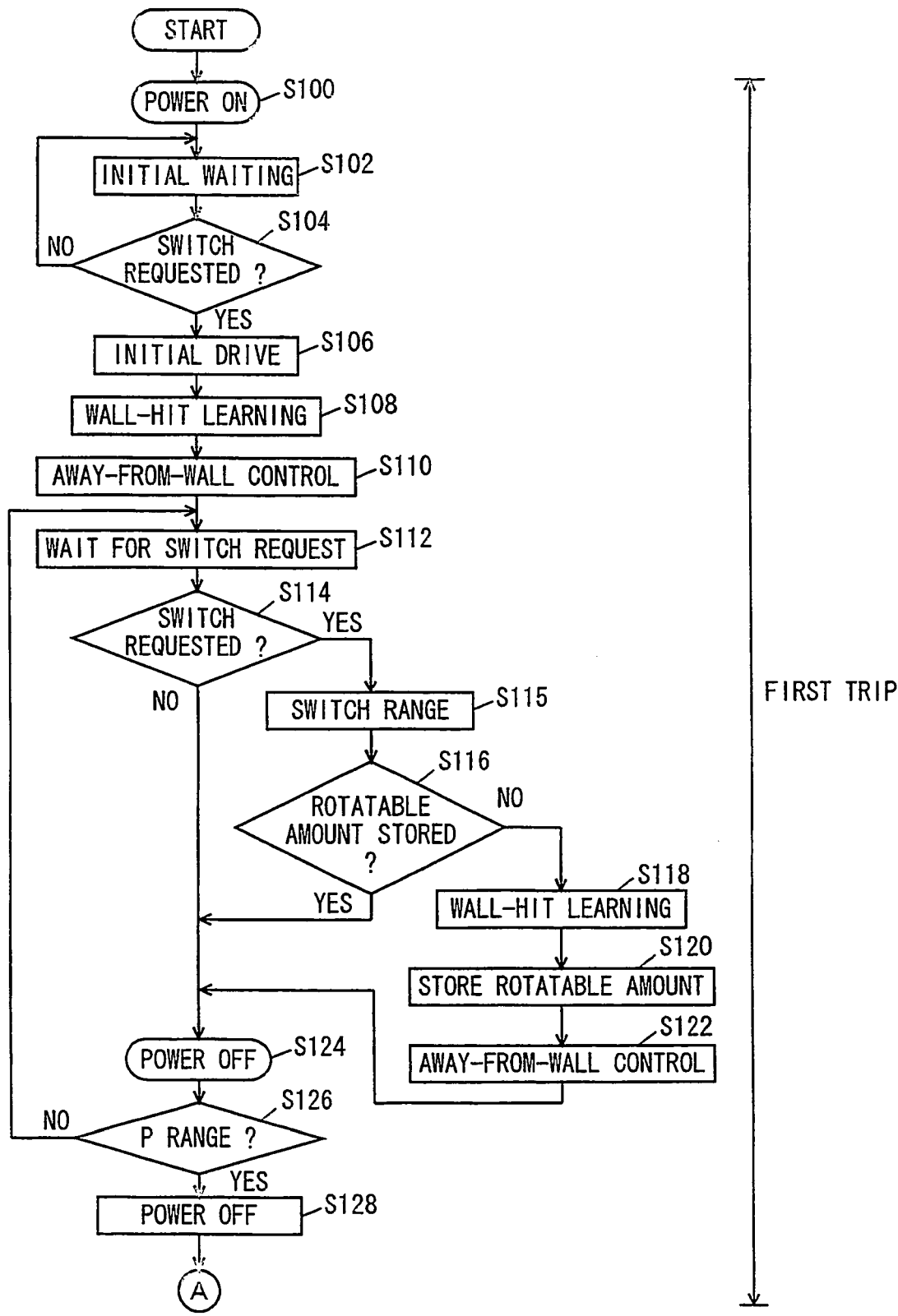
FIGS. 12A and 12B are flowcharts showing a control structure of a program executed by a P-ECU according to the second embodiment.
Figure 12B:
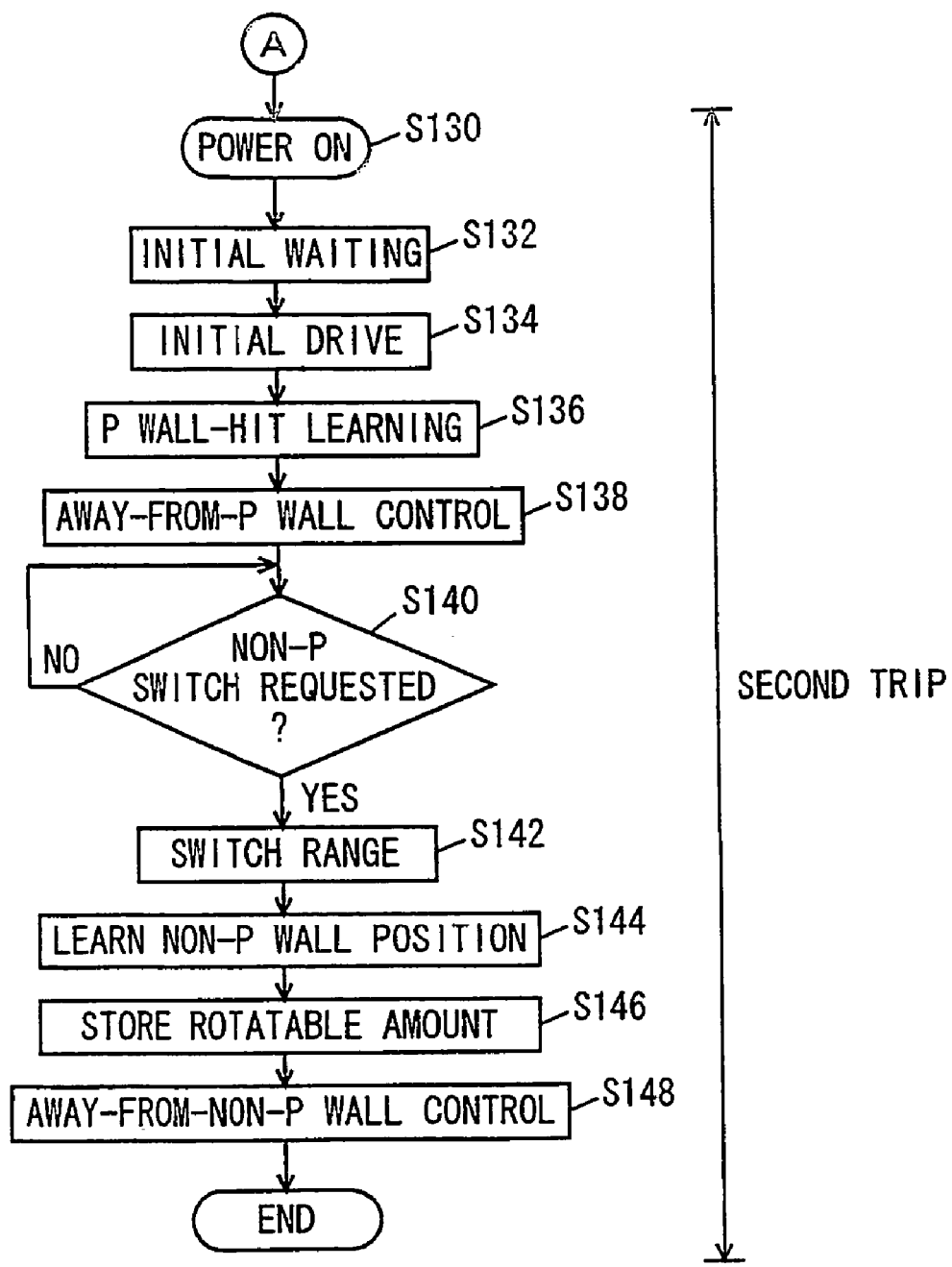

Referring to respective flowcharts in FIGS. 12A and 12B, a description is given of a process of detecting, if the shift range is unknown upon power-on for the first trip, the actual rotatable amount in response to power-on for the second trip.

In S100, in response to user's operation of vehicle power switch 28, the vehicle is powered, namely electric power supply to shift control system 10 is started.

In S102, P-ECU 40 determines the current shift range based on a shift range stored in the internal memory on a preceding trip. At this time, the current shift range is unknown due to initialization of the battery for example. Therefore, P-ECU 40 waits until a switch request is issued from V-ECU 30. V-ECU 30 determines the current shift range from the vehicle speed. Specifically, V-ECU 30 determines that the current shift range is the P range if the vehicle speed is for example 3 km/h or lower. Then, V-ECU 30 sends a signal indicative of a switch request of the P range to P-ECU 40. The internal memory of P-ECU 40 includes a rewritable non-volatile memory. The non-volatile memory is for example an SRAM (Static Random Access Memory).

V-ECU 30 determines that the current shift range is the non-P range if the vehicle speed is for example higher than 3 km/h. Such a case could occur if the power is turned off due to a certain cause when the vehicle is running and the power is thereafter turned on again. In this case, V-ECU 30 sends a signal indicative of a switch request of the non-P range to P-ECU 40.

In S104, P-ECU 40 determines whether or not the signal indicative of the switch request is given from P-ECU 30. If the shift range switch request is issued (YES in S104), this process proceeds to S106. If not (NO in S104), the process returns to S102.

In S106, if the shift range switch request is issued from V-ECU 30, P-ECU 40 then performs an initial drive operation, namely, in encoder 46, the rotor phase and the energization phase are matched.

In S108, for the shift range whose switching is requested by V-ECU 30, P-ECU 40 detects the wall position through the wall-hit learning. Specifically, if V-ECU 30 determines that the current shift range is the P range based on the vehicle speed, V-ECU 30 sends the signal indicative of switching request of the P range to P-ECU 40. Under the condition that the current shift range is the P range, P-ECU 40 performs the wall-hit learning by causing the roller initially in the P range position to hit against the P wall. If V-ECU 30 determines that the current shift range is the non-P range, P-ECU 40 similarly performs the wall-hit learning by causing the roller initially in the non-P range position to hit against the non-P wall.

In S110, after the wall position is detected, P-ECU 40 drives actuator 42 to a position away from the wall position by a margin and thereafter turns off energization to actuator 42. Specifically, P-ECU 40 calculates the target rotational position based on the detected wall position. P-ECU 40 then drives actuator 42 to rotate detent plate 100 so as to set roller 112 at the calculated target rotational position.

In S112, P-ECU 40 waits until a shift range switch signal is supplied from the user.

In S114, P-ECU 40 determines whether the switch request is given from the user. If the switch request is issued from the user (YES in S114), the process proceeds to S115. If not (NO in S114), the process proceeds to S124.

In S115, if the range switch request is given from the user, P-ECU 40 allows actuator 42 to rotate in the direction of the requested range by a predetermined rotational amount. Here, the predetermined rotational amount is defined so that the roller does not hit against the wall corresponding to the requested range. In other words, the predetermined rotational amount may be the one to reach the target rotational position corresponding to the requested range that is calculated based on the designed rotatable amount.

In S116, P-ECU 40 determines whether or not the internal memory stores the actual rotatable amount. If the actual rotatable amount is stored in the internal memory (YES in S116), the process proceeds to S124. If not (NO in S116), the process proceeds to S118.

In S118, P-ECU 40 detects the wall position through the wall-hit learning for the shift range to which switching is requested by V-ECU 30. Specifically, if the user makes a request to switch the shift range to the non-P range, P-ECU 40 rotates actuator 42 to switch the shift range from the P range to the non-P range. Then, P-ECU 40 detects the non-P wall position.

In S120, P-ECU 40 calculates the actual rotatable amount based on the wall position detected in S108 and the wall position detected in S118. Then, P-ECU 40 stores the calculated actual rotatable amount in the internal memory.

In S122, after the wall position is detected, P-ECU 40 drives actuator 42 to a position away from the wall position by a margin and then turns off energization to actuator 42. Specifically, P-ECU 40 calculates the target rotational position based on the detected wall position. Then, P-ECU 40 drives actuator 42 to rotate detent plate 100 and thereby set roller 112 at the calculated target rotational position.

In S124, in response to user's operation of vehicle power switch 28, a request to shut off the power is received.

In S126, P-ECU 40 determines whether the current shift range is the P range or not. If the current shift range is the P range (YES in S126), the process proceeds to S128. If not (NO in S126), the process returns to S112.

In S128, if P-ECU 40 determines that the current shift range is the P range, V-ECU 30 permits the power to be turned off. V-ECU 30 accordingly turns off the power of the vehicle. The operation of storing the shift range in the internal memory of P-ECU 40 is not limited to a particular one, and the shift range may be stored each time the switching request signal is received from the user or when the power is turned off.

In S130, in response to user's operation of vehicle power switch 2S, the vehicle is turned on for the second time.

In S132, on this second trip, since the shift range is stored on the preceding trip, the initial waiting operation until the switch request is given from V-ECU 30 is skipped. In this case, since the power cannot be turned off unless the shift range is switched to the P range when the preceding trip is ended, the shift range stored in the internal memory of P-ECU 40 on the second trip is the P range.

In S134, an initial drive operation, namely matching is done in encoder 46 between the rotor phase and the energization phase.

In S136, P-ECU 40 detects the wall position through the wall-hit learning based on the shift range stored on the preceding trip. Specifically, P-ECU 40 detects the P wall position by causing the roller originally in the P range position to hit against the P wall.

In S138, after the P wall position is detected, P-ECU 40 calculates the P target rotational position away from the P wall position by a margin. Then, P-ECU 40 drives actuator 42 to set roller 112 at the calculated P target rotational position. P-ECU 40 thereafter turns off energization to actuator 42.

In S140, P-ECU 40 determines whether or not a shift range switch request is issued from the user. If the shift range switch request is given from the user (YES in S140), the process proceeds to S142. If not (NO in S140), P-ECU 40 waits until the shift range switch request is given from the user.

In S142, when the user issues the range switch request, P-ECU 40 causes actuator 42 to rotate by a predetermined rotational amount in the direction of the non-P range. The predetermined rotational amount is the one to allow the roller not to hit against the non-P wall. Here, the predetermined rotational amount may be the one to reach the non-P target rotational position calculated from the actual rotatable amount determined on the first trip, or the one to reach the non-P target rotational position calculated from the designed rotatable amount.

In S144, P-ECU 40 performs the wall-hit learning by causing the roller initially in the non-P range position to hit against the non-P wall. In other words, P-ECU 40 detects the non-P wall position.

In S146, based on the detected P wall position and the non-P wall position, the actual rotatable amount is calculated and stored.

In S148, after the non-P wall position is detected, P-ECU 40 calculates the non-P target rotational position away from the non-P wall position by a margin. P-ECU 40 then drives actuator 42 to set roller 112 at the calculated non-P target rotational position. After this, P-ECU 40 turns off energization to actuator 42.

Referring to respective timing charts in FIGS. 13A-13D, an operation is described in detail of shift control system 10 of this embodiment based on the above-described structure and flowcharts.

FIG. 13A shows a signal indicating a switch request that is sent to P-ECU 40. The switch request signal is transmitted to P-ECU 40 according to an instruction from the user or an instruction from V-ECU 30. If no switch request signal is sent, the switch request signal is unknown. FIG. 13B shows a change in control mode. The control mode includes at least a mode when the power is turned on and a control mode for detecting the non-P wall position. FIG. 13C shows a change in count number obtained by encoder 46, and FIG. 13D shows a current shift range.

Referring to FIG. 13B, when the user turns on the power with vehicle power switch 28 (S100), P-ECU 40 performs the initial waiting operation until the switch request is given from V-ECU 30 (S102) since the shift range stored in the internal memory is unknown. V-ECU 30 determines that the current shift range is the P range since the vehicle is stopped. Referring to FIG. 13A, P-ECU 40 receives the switch request of the P range from V-ECU 30 (YES in S104). In encoder 46, the rotor phase and the energization phase are matched (S106). Referring to FIG. 13C, P-ECU 40 performs the wall-hit-learning by causing the roller initially in the P range position to hit against the P wall (S108). After the P wall position is detected, P-ECU 40 rotates actuator 42 until roller 112 reaches the P target rotational position located away from the P wall position toward the non-P range position by a predetermined margin (S110). At this time, P-ECU 40 waits until it receives the switch request from the user (S112). Referring again to FIG. 13A, when the switch request to the non-P range is given from the user (YES in S114), the range is switched (S115). If the actual rotatable amount is not stored (NO in S116), referring back to FIG. 13B, the mode enters the control mode for the wall-hit-learning for the non-P range (S118). After the wall position for the non-P range is detected, P-ECU 40 calculates the actual rotatable amount based on the wall position for the P range and the wall position for the non-P range. Then, P-ECU 40 stores the calculated rotatable amount in the internal memory (S120). Referring again to FIG. 13C, P-ECU 40 rotates actuator 42 until roller 112 reaches the non-P target rotational position away from the non-P wall position toward the P range position by a predetermined margin (S122). When the request to shut off the power is received from the user (S124), P-ECU 40 waits for the switch request of the shift range from the user (S112) if the current shift range is the non-P range (NO in S126). Referring again to FIG. 13A, according to the switch request to the P range from the user (YES in S114), since the actual rotatable amount is stored (YES in S116), V-ECU 30 shuts off the power supply (S128) upon receiving the request to shut off the power from the user (S124) if the current shift range is the P range (YES in S126).

Referring again to FIG. 13B, according to the request to turn on the power supply from the user, the power is turned on for the second time (S130). Since the previous shift range is stored in the internal memory, P-ECU 40 skips the initial waiting operation (S132). Then, in encoder 46, the rotor phase and the energization phase are matched (S134). Referring back to FIG. 13C, since the current shift range is the P range, P-ECU 40 detects the P wall position through "P wall-hit learning" by causing the roller to hit against the P wall (S136). After the P wall position is detected, P-ECU 40 rotates actuator 42 until roller 112 reaches the P target rotational position (S138). Referring again to FIG. 13A, when the switch request to the non-P range is issued from the user (YES in S140), P-ECU 40 switches the range (S142). Referring then to FIG. 13B, in the non-P range, the non-P wall position is detected (S144). After the non-P wall position is detected, P-ECU 40 calculates the actual rotatable amount of actuator 42 based on the P wall position and the non-P wall position to store the amount in the internal memory (S146) and rotates actuator 42 until roller 112 reaches the non-P target rotational position (S148).

After this, according to the P range switch request from the user, P-ECU 40 switches the range and, when the request to shut off the power is made by the user when the shift range is the P range, V-ECU 30 shuts off the power.

Accordingly, when the user turns on the power for the third time, the current shift range and the rotatable amount are stored in the internal memory of P-ECU 40. Referring to FIG. 13B again, if the switch request is issued from the user after the P wall position is learned, the range is switched while the non-P wall position is not detected.

It is assumed here that the shift range is any except for the P range when the power is turned on for the second time (second trip) after initialization of the battery. This situation occurs for example when the power is shut off when the vehicle is running due to any abnormality of actuator 42 or any cause even if the actuator is normal and the power is turned on again. In this situation, P-ECU 40 detects both of the wall positions and calculates the target rotational position and the actual rotatable amount on the next trip.

As discussed above, shift control system 10 of this embodiment of the present invention requires no neutral switch and exhibits the following effects. In order to turn off the power for the shift control system 10, the shift range has to be switched to the P range. Therefore, when the power is turned on again, the shift range is surely the P range. At this time, since the P wall position is detected when the shift range is the P range, the rotational force of actuator 42 is smaller than the one when the P wall position is detected by causing the roller initially in the non-P range position to hit against the P wall. Thus, deformation of detent spring 110 is prevented or reduced. Since deformation of detent spring 110 is prevented or reduced, the reference position for the P range is accurately detected and the actual rotatable amount, the P target rotational position and the non-P target rotational position are accurately learned as well based on the P wall position. Moreover, the accurate switch of the shift range improves the durability of shift switching mechanism 48.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A shift control system having a plurality of successive shift ranges and that switches a shift range among said plurality of successive shift ranges via an actuator, comprising:
    shift means driven by said actuator for switching the shift range;
    restriction means for restricting, in an endmost shift range among said plurality of successive shift ranges, rotation of said actuator in the direction where no adjacent shift range is present;
    rotation control means for rotating said actuator;
    count means for obtaining a count value according to a relative rotational amount of said actuator; and
    position setting means for setting, when said actuator is rotated by said rotation control means in the direction in which rotation of said actuator is restricted by said restriction means in said endmost shift range, a reference position of said actuator corresponding to said endmost shift range based on a state of said count value obtained by said count means,
    wherein said position setting means includes reference position setting means for setting the reference position of said actuator by detecting that said count value obtained by said count means is in a state where a minimum value or a maximum value of said count value is constant for a predetermined period of time.

2. The shift control system according to claim 1, wherein said rotation control means includes means for making smaller an output per unit time of said actuator driven for setting the reference position of said actuator than an output per unit time of said actuator driven for switching the shift range.

3. The shift control system according to claim 1, wherein said position setting means includes reference position setting means for setting a reference position of said actuator corresponding to another shift range different from said endmost shift range, based on a rotatable amount of said actuator between said endmost shift range and said another shift range.

4. The shift control system according to claim 1, wherein said position setting means includes reference position setting means for setting, when said shift means switches said endmost shift range to another shift range, a reference position of said actuator corresponding to said another shift range.

5. The shift control system according to claim 4, wherein said position setting means includes detection means for detecting a rotatable amount of said actuator based on the reference position corresponding to said endmost shift range and the reference position corresponding to said another shift range.

6. The shift control system according to claim 1, wherein said position setting means includes reference position setting means for setting a reference position of said actuator corresponding to another shift range at a predetermined timing in order to correct a backlash due to secular change of said shift means or said restriction means.

7. The shift control system according to claim 6, wherein said position setting means includes detection means for detecting a rotatable amount of said actuator based on the reference position corresponding to said endmost shift range and the reference position corresponding to said another shift range.

8. The shift control system according to claim 1, wherein said position setting means includes setting means for setting, based on said reference position, a target rotational position, to be attained when the shift range is switched, of said actuator in the shift range with said reference position being set.

9. The shift control system according to claim 8, wherein said rotation control means includes adjustment means for adjusting, when the shift range is switched, the rotational amount of said actuator to allow said actuator to attain said target rotational position by rotating said actuator to drive said shift means.

10. A shift control system having a plurality of successive shift ranges and that switches a shift range among said plurality of successive shift ranges via an actuator, comprising:
   shift means driven by said actuator for switching the shift range;
   restriction means for restricting, in an endmost shift range among said plurality of successive shift ranges, rotation of said actuator in the direction where no adjacent shift range is present;
   rotation control means for rotating said actuator;
   count means for obtaining a count value according to a relative rotational amount of said actuator; and
   position setting means for setting, when said actuator is rotated by said rotation control means in the direction in which rotation of said actuator is restricted by said restriction means in said endmost shift range, a reference position of said actuator corresponding to said endmost shift range based on a state of said count value obtained by said count means,
   wherein said position setting means includes reference position setting means for setting a reference position of said actuator corresponding to another shift range different from said endmost shift range, based on a rotatable amount of said actuator between said endmost shift range and said another shift range.

11. A shift control system having a plurality of successive shift ranges and that switches a shift range among said plurality of successive shift ranges via an actuator, comprising:
   shift means driven by said actuator for switching the shift range;
   restriction means for restricting, in an endmost shift range among said plurality of successive shift ranges, rotation of said actuator in the direction where no adjacent shift range is present;
   rotation control means for rotating said actuator;
   count means for obtaining a count value according to a relative rotational amount of said actuator; and
   position setting means for setting, when said actuator is rotated by said rotation control means in the direction in which rotation of said actuator is restricted by said restriction means in said endmost shift range, a reference position of said actuator corresponding to said endmost shift range based on a state of said count value obtained by said count means,
   wherein said position setting means includes reference position setting means for setting a reference position of said actuator corresponding to another shift range at a predetermined timing in order to correct a backlash due to secular change of said shift means or said restriction means.

12. The shift control system according to claim 11, wherein said position setting means includes detection means for detecting a rotatable amount of said actuator based on the reference position corresponding to said endmost shift range and the reference position corresponding to said another shift range.

13. A shift control system having a plurality of successive shift ranges and that switches a shift range among said plurality of successive shift ranges via an actuator, comprising:
   a shift component driven by said actuator that switches the shift range;
   a restriction component that restricts, in an endmost shift range among said plurality of successive shift ranges, rotation of said actuator in the direction where no adjacent shift range is present;
   a rotation control unit that rotates said actuator;
   a count unit for obtaining a count value according to a relative rotational amount of said actuator; and
   a position setting unit that sets, when said actuator is rotated by said rotation control unit in the direction in which rotation of said actuator is restricted by said restriction unit in said endmost shift range, a reference position of said actuator corresponding to said endmost shift range based on a state of said count value obtained by said count unit,
   wherein said position setting unit sets the reference position of said actuator by detecting that said count value obtained by said count unit is in a state where a minimum value or a maximum value of said count value is constant for a predetermined period of time.

14. The shift control system according to claim 13, wherein said position setting unit sets a reference position of said actuator corresponding to another shift range different from said endmost shift range, based on a rotatable amount of said actuator between said endmost shift range and said another shift range.

15. The shift control system according to claim 13, wherein said position setting unit sets, when said shift component switches said endmost shift range to another shift range, a reference position of said actuator corresponding to said another shift range.

16. The shift control system according to claim 15, wherein said position setting unit detects a rotatable amount of said actuator based on the reference position corresponding to said endmost shift range and the reference position corresponding to said another shift range.

17. The shift control system according to claim 13, wherein said position setting unit sets a reference position of said actuator corresponding to another shift range at a predetermined timing in order to correct a backlash due to secular change of said shift component or said restriction component.

18. The shift control system according to claim 17, wherein said position setting unit detects a rotatable amount of said actuator based on the reference position corresponding to said endmost shift range and the reference position corresponding to said another shift range.

19. The shift control system according to claim 13, wherein said rotation control unit makes smaller an output per unit time of said actuator driven for setting the reference position of said actuator than an output per unit time of said actuator driven for switching the shift range.

20. The shift control system according to claim 13, wherein said position setting unit sets, based on said reference position, a target rotational position, to be attained when the shift range is switched, of said actuator in the shift range with said reference position being set.

21. The shift control system according to claim 20, wherein said rotation control unit adjusts, when the shift range is switched, the rotational amount of said actuator to allow said actuator to attain said target rotational position by rotating said actuator to drive said shift component.

22. A shift control system having a plurality of successive shift ranges and that switches a shift range among said plurality of successive shift ranges via an actuator, comprising:
- a shift component driven by said actuator that switches the shift range;
- a restriction component that restricts, in an endmost shift range among said plurality of successive shift ranges, rotation of said actuator in the direction where no adjacent shift range is present;
- a rotation control unit that rotates said actuator;
- a count unit for obtaining a count value according to a relative rotational amount of said actuator; and
- a position setting unit that sets, when said actuator is rotated by said rotation control unit in the direction in which rotation of said actuator is restricted by said restriction unit in said endmost shift range, a reference position of said actuator corresponding to said endmost shift range based on a state of said count value obtained by said count unit,
- wherein said position setting unit sets a reference position of said actuator corresponding to another shift range different from said endmost shift range, based on a rotatable amount of said actuator between said endmost shift range and said another shift range.

23. A shift control system having a plurality of successive shift ranges and that switches a shift range among said plurality of successive shift ranges via an actuator, comprising:
- a shift component driven by said actuator that switches the shift range;
- a restriction component that restricts, in an endmost shift range among said plurality of successive shift ranges, rotation of said actuator in the direction where no adjacent shift range is present;
- a rotation control unit that rotates said actuator;
- a count unit for obtaining a count value according to a relative rotational amount of said actuator; and
- a position setting unit that sets, when said actuator is rotated by said rotation control unit in the direction in which rotation of said actuator is restricted by said restriction unit in said endmost shift range, a reference position of said actuator corresponding to said endmost shift range based on a state of said count value obtained by said count unit,
- wherein said position setting unit sets a reference position of said actuator corresponding to another shift range at a predetermined timing in order to correct a backlash due to secular change of said shift component or said restriction component.

24. The shift control system according to claim 23, wherein said position setting unit detects a rotatable amount of said actuator based on the reference position corresponding to said endmost shift range and the reference position corresponding to said another shift range.

* * * * *